US012687807B2

(12) United States Patent
Nakajima

(10) Patent No.: US 12,687,807 B2
(45) Date of Patent: Jul. 21, 2026

(54) IMAGE HEATING DEVICE AND IMAGE FORMING APPARATUS

(71) Applicant: CANON KABUSHIKI KAISHA, Tokyo (JP)

(72) Inventor: Nozomu Nakajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 18/778,827

(22) Filed: Jul. 19, 2024

(65) Prior Publication Data

US 2025/0036057 A1 Jan. 30, 2025

(30) Foreign Application Priority Data

Jul. 26, 2023 (JP) ................................ 2023-121724

(51) Int. Cl.

*G03G 15/20* (2006.01)
*G03G 15/00* (2006.01)

(52) U.S. Cl.

CPC ..... *G03G 15/2057* (2013.01); *G03G 15/2039* (2013.01); *G03G 15/2064* (2013.01); *G03G 15/80* (2013.01)

(58) Field of Classification Search

CPC ........... G03G 15/2017; G03G 15/2039; G03G 15/2042; G03G 15/2046; G03G 15/205

See application file for complete search history.

(56) References Cited

U.S. PATENT DOCUMENTS

2020/0233348 A1* 7/2020 Nakajima .......... G03G 15/2042

FOREIGN PATENT DOCUMENTS

JP 2004138839 A 5/2004

* cited by examiner

*Primary Examiner* — Thomas S Giampaolo, II

(74) *Attorney, Agent, or Firm* — Canon U.S.A., Inc. IP Division

(57) ABSTRACT

An image heating device includes a fixing member, a heater configured to heat the fixing member, and a heater control circuit configured to control the heater. The image heating device is configured to heat a toner image formed on a sheet. The heater includes a base substrate and a heat generating unit, the heat generating unit being provided on the base substrate and configured to generate heat when powered. The heater control circuit includes a first power supply channel through which a first power is supplied to the heat generating unit, a second power supply channel through which a second power lower than the first power is supplied to the heat generating unit, and a switch unit. The switch unit includes a semiconductor switch including a plurality of semiconductors, and is configured to selectively switch between the first and second power supply channels with the operation of the semiconductor switch.

21 Claims, 16 Drawing Sheets

PSC3
200
106a
103
110
202
202
136
ON
201
201
131
106b
106c
104

PSC4
200
106a
103
110
202
202
136
OFF
201
201
131
106b
106c
104

PSC3
202
201
110
136
ON
131

PSC4
202
201
110
136
OFF
131

IMAGE HEATING DEVICE AND IMAGE FORMING APPARATUS

BACKGROUND

Field of the Disclosure

The present disclosure relates to an image heating device configured to heat a toner image formed on a sheet, and to an image forming apparatus including the same.

Description of the Related Art

An image heating device disclosed in Japanese Patent Laid-Open No. 2004-138839 includes a heater including a plurality of heat generating elements. The way of power supply to the plurality of heat generating elements is changed by using a relay, whereby the resistance value of the heater as a whole is changed. In the image heating device, to heat a fixing unit that is yet cold, the relay is turned on, whereby the power to be supplied to the heater is made relatively high. When the fixing unit is warmed up, the relay is turned off, whereby the power to be supplied to the heater is made relatively low.

In the image heating device disclosed in Japanese Patent Laid-Open No. 2004-138839, the switching of the relay temporarily stops the power supply to the heater. Such a situation may delay the rise of the temperature of the heater and increase the first print-out time (hereinafter abbreviated to FPOT), which refers to a time period that is taken from when a print job is issued to an image forming apparatus until a corresponding image is printed on a first sheet.

In another respect, the configuration disclosed in Japanese Patent Laid-Open No. 2004-138839 produces a heat distribution that is asymmetrical in the short-side direction of the heater. Such a configuration tends to produce a large thermal stress to the base of the heater. To reduce the FPOT, the power to be supplied to the heater needs to be increased. Correspondingly, the thermal stress to the base of the heater increases. That is, to reduce the FPOT, the heat distribution of the heater needs to be made as even as possible to reduce the thermal stress to the base of the heater.

SUMMARY OF THE DISCLOSURE

The present disclosure provides an image heating device and an image forming apparatus that exhibit a reduced FPOT or a reduced thermal stress to a base substrate of a heater.

According to an aspect of the present disclosure, there is provided an image heating device including a fixing member, a heater configured to heat the fixing member, and a heater control circuit configured to control the heater. The image heating device is configured to heat a toner image formed on a sheet. The heater includes a base substrate and a heat generating unit, the heat generating unit being provided on the base substrate and configured to generate heat when powered. The heat generating unit includes a first heat generating element and a second heat generating element each extending in a long-side direction and being configured to generate heat when powered, the long-side direction being orthogonal to a short-side direction that is parallel to a sheet conveying direction. The first heat generating element includes a first heat generating part and a second heat generating part, the first heat generating part being provided at one end part of the base substrate in the short-side direction, the second heat generating part being provided at an other end part of the base substrate in the short-side direction. The second heat generating element is provided between the first heat generating part and the second heat generating part in the short-side direction. The heater control circuit includes a first power supply channel through which a first power is supplied to the heat generating unit, a second power supply channel through which a second power that is lower than the first power is supplied to the heat generating unit, and a switch unit configured to selectively switch between the first power supply channel and the second power supply channel.

According to the above aspect of the present disclosure, the FPOT is reduced, or the thermal stress to the base substrate of the heater is reduced.

Further features of the present disclosure will become apparent from the following description of exemplary embodiments with reference to the attached drawings.

DESCRIPTION OF THE EMBODIMENTS

First Embodiment

Overall Configuration

A first embodiment of the present disclosure will now be described. An image forming apparatus 80 according to the first embodiment is an inline (tandem), full-color, laser-beam printer.

The term "image forming apparatus" encompasses a printer, a copier, a facsimile, and a multifunction machine and refers to any apparatus that is configured to form an image on a sheet, which serves as a recording medium, on the basis of image information that is received from an external personal computer (PC) or image information that is read from an original. The image forming apparatus includes a main body having an image forming function and may be provided with additional devices such as an optional feeder, an image reading device, and a sheet processing device. A system inclusive of any of such additional devices is also regarded as an image forming apparatus. Examples of the sheet according to the present embodiment include a piece of paper, paper in the form of an envelope or the like, a plastic film such as a sheet for overhead projectors (OHPs), and a piece of fabric.

Figure 1:
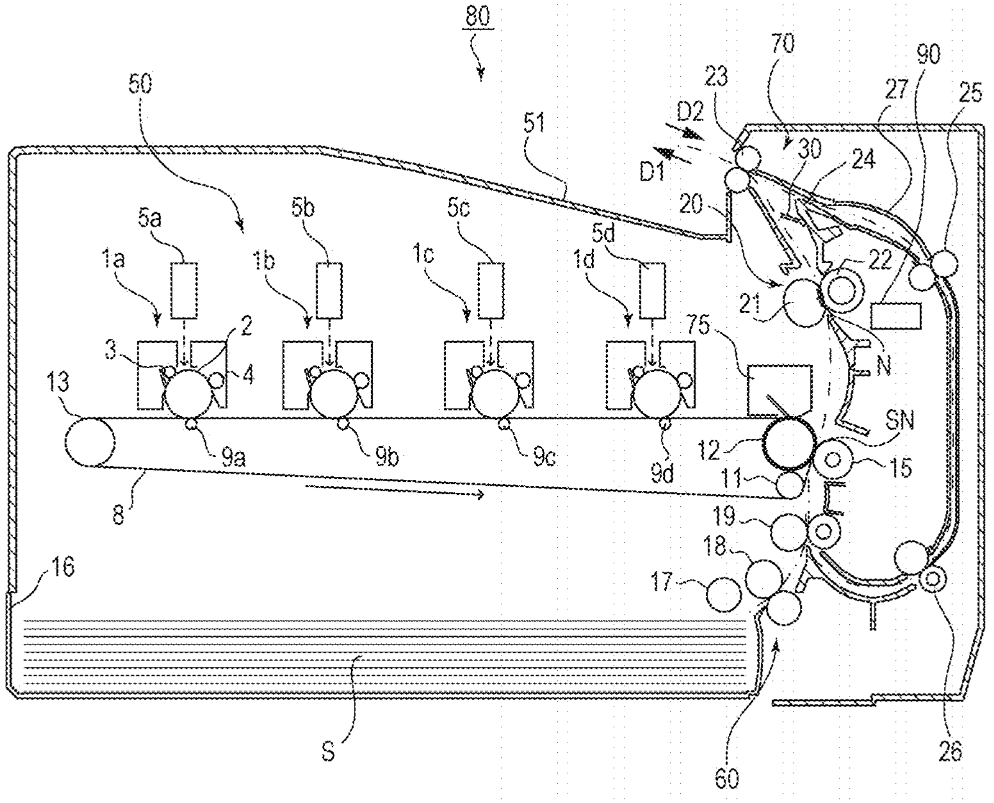
FIG. 1 outlines an image forming apparatus according to a first embodiment.

As illustrated in FIG. 1, the image forming apparatus 80 includes a sheet feeder 60, an image forming unit 50, a fixing unit 20, a reversal conveyor 70, and a controller 90. The controller 90 includes a central processing unit (CPU), a read-only memory (ROM), and a random access memory (RAM), which are not illustrated. The ROM stores relevant programs. The CPU is configured to read and execute the programs stored in the ROM. The RAM is used as a work area for the CPU.

When a command for image formation is issued to the image forming apparatus 80, the image forming unit 50 starts an imaging operation on the basis of image information received from an external computer or the like connected to the image forming apparatus 80. The image forming unit 50 includes four process cartridges 1a, 1b, 1c, and 1d; exposure devices 5a, 5b, 5c, and 5d; and an intermediate transfer belt 8. The process cartridges 1a, 1b, 1c, and 1d are configured to form respective images in four respective colors of yellow (Y), magenta (M), cyan (C), and black (Bk). The exposure devices 5a, 5b, 5c, and 5d are provided in correspondence with photoconductor drums included in the respective process cartridges 1a, 1b, 1c, and 1d.

The four process cartridges 1a, 1b, 1c, and 1d are configured the same in all respects but the colors of the images to be formed. The following description focuses on the imaging operation of the process cartridge 1a alone, and description of the process cartridges 1b, 1c, and 1d is omitted.

The exposure device 5a for the process cartridge 1a emits a laser beam toward a photoconductor drum 2 included in the process cartridge 1a, on the basis of image information received. Before this process, the photoconductor drum 2 is charged by a charging roller 4. With the application of the laser beam to the photoconductor drum 2, an electrostatic latent image is formed on the photoconductor drum 2. Meanwhile, the photoconductor drum 2, which serves as an image carrying member, is being rotated at a predetermined process speed by a motor (not illustrated). Then, the electrostatic latent image is developed by a developing roller 3, whereby a toner image in yellow (Y) is formed on the photoconductor drum 2.

Likewise, toner images in magenta (M), cyan (C), and black (Bk) are formed on the respective photoconductor drums included in the process cartridges 1b, 1c, and 1d. The toner images in the respective colors on the respective photoconductor drums are transferred to the intermediate transfer belt 8 by respective primary transfer rollers 9a, 9b, 9c, and 9d.

The toner images thus transferred to the intermediate transfer belt 8 are conveyed by the intermediate transfer belt 8, which is rotating in a direction represented by an arrow in FIG. 1, to a secondary transfer roller 15, which serves as a transfer roller. Note that imaging operations for the individual colors are performed with respective timings with which the toner images are primarily transferred to the intermediate transfer belt 8 in such a manner as to be superposed one on top of another in order from the upstream one.

The intermediate transfer belt 8 is wrapped around an assist roller 11, a driving roller 12, and a tension roller 13. In other words, the intermediate transfer belt 8 is stretched around the assist roller 11, the driving roller 12, and the tension roller 13. The intermediate transfer belt 8 rotates with the rotation of the driving roller 12, which is rotated by a motor (not illustrated). The driving roller 12 includes a high-friction rubber layer forming a surface layer thereof and provided for moving the intermediate transfer belt 8. The rubber layer is electrically conductive with a volume resistivity of 10.5 Ωcm or smaller. The driving roller 12 is positioned in such a manner as to nip the intermediate transfer belt 8 in cooperation with the secondary transfer roller 15. Specifically, the driving roller 12 is positioned across from the secondary transfer roller 15 with the intermediate transfer belt 8 interposed therebetween. The intermediate transfer belt 8 is nipped by the driving roller 12 and the secondary transfer roller 15. Between the intermediate transfer belt 8 and the secondary transfer roller 15 is formed a transfer nip SN.

The secondary transfer roller 15 is an elastic roller having a volume resistivity of 107 to 109 Ωcm and a rubber hardness of 30° (measured with an Asker C hardness tester). The secondary transfer roller 15 is configured to be pressed against the driving roller 12 with a total pressure of about 39.2 N and with the intermediate transfer belt 8 in between. The secondary transfer roller 15 rotates by following the intermediate transfer belt 8. The secondary transfer roller 15 is configured to receive a voltage of −2.0 to 7.0 kV from a transfer power source (not illustrated).

Along with the above imaging operation, one of sheets S stored in a cassette 16, which is provided at the bottom of the image forming apparatus 80, is picked up by a pickup roller 17. The sheet S picked up by the pickup roller 17 is conveyed by a conveying roller pair 18 to a registration roller pair 19.

The sheet S knocks against the nip formed at the registration roller pair 19 that is stationary, whereby any skew in the sheet S is corrected. The registration roller pair 19 conveys the sheet S with a predetermined timing of conveyance. A secondary transfer bias is applied to the secondary transfer roller 15, whereby the full-color toner image formed on the intermediate transfer belt 8 is transferred to a first side of the sheet S at the transfer nip SN. Any residual toner particles on the intermediate transfer belt 8 are collected by a cleaner 75.

The sheet S having the toner image transferred thereto is subjected to predetermined heat and pressure in the fixing unit 20, whereby the toner is fused (fixed). The sheet S exited from the fixing unit 20 is discharged to a discharge tray 51 by a discharge roller pair 23, which is included in the reversal conveyor 70.

The reversal conveyor 70 includes the discharge roller pair 23, a discharge sensor 30, and a reversal guide 24. The discharge sensor 30 and the reversal guide 24 are provided between the fixing unit 20 and the discharge roller pair 23. The discharge sensor 30 is capable of detecting the position of the trailing end of the sheet S and includes, for example, a flag and an optical sensor. The flag is configured to move when pushed by the sheet S. The optical sensor is configured to detect the movement of the flag. The reversal guide 24 is configured to guide the sheet S into a duplex conveyance path 27, to be described below, when the sheet S is reversely conveyed by the discharge roller pair 23.

In a case where images are to be formed on both sides of the sheet S, the sheet S is first conveyed in a first direction D1 toward the outside of the image forming apparatus 80 by the fixing unit 20 and the discharge roller pair 23. In response to the discharge sensor 30 detecting the trailing end of the sheet S conveyed in the first direction D1 and after the trailing end of the sheet S passing a predetermined position, the discharge roller pair 23 reversely rotates. Thus, the sheet S conveyed by the discharge roller pair 23 is switched back in a second direction D2, which is opposite to the first direction D1.

The sheet S thus switched back is then guided by the reversal guide 24 into the duplex conveyance path 27, is further conveyed by transporting roller pairs 25 and 26, and reaches the registration roller pair 19 again. A switching member that is movable between a first position and a second position may be provided between the discharge sensor 30 and the discharge roller pair 23. The switching member that is in the first position may guide the sheet S, being conveyed by the fixing unit 20, to the discharge roller pair 23. The switching member that is in the second position may guide the sheet S, being reversely conveyed by the discharge roller pair 23, to the reversal guide 24. In response to the discharge sensor 30 detecting the trailing end of the sheet S conveyed in the first direction D1, the switching member may move from the first position to the second position.

Then, another toner image is transferred to a second side of the sheet S at the transfer nip SN and is fixed by the fixing unit 20. The sheet S now having respective images on the first side and the second side thereof is discharged to the discharge tray 51 by the discharge roller pair 23.

Fixing Unit

Figure 2:
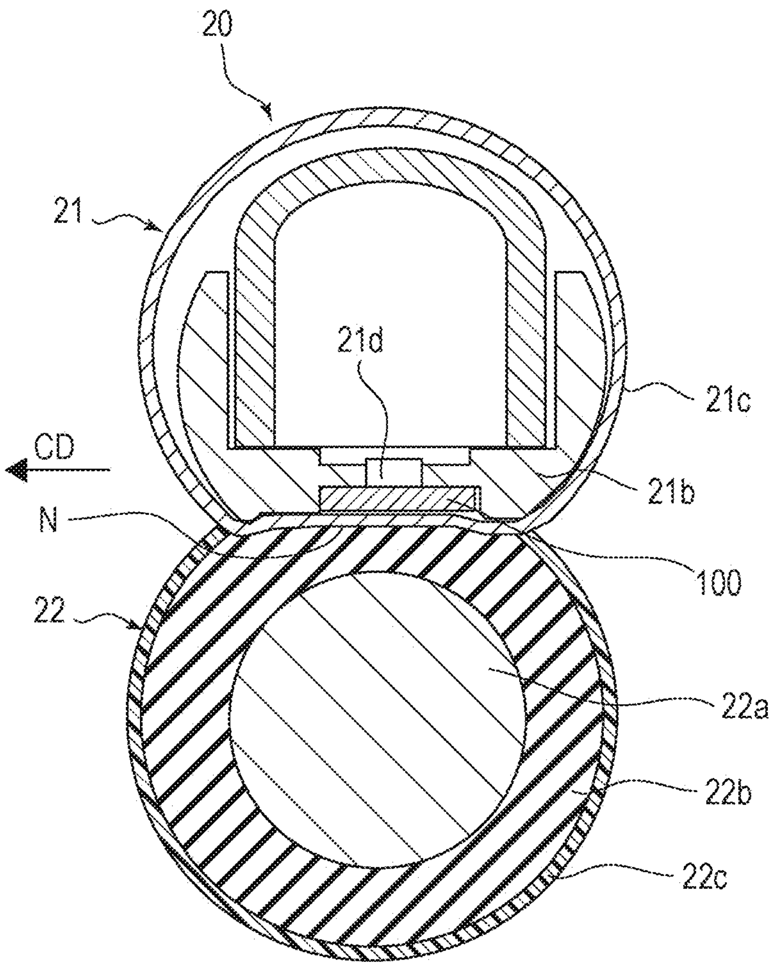
FIG. 2 illustrates a section of a fixing unit.

The fixing unit 20 will now be described in detail with reference to FIG. 2. The fixing unit 20 serves as an image heating device configured to heat the toner image formed on the sheet S and includes, as illustrated in FIG. 2, a heating unit 21 and a pressure roller 22. The heating unit 21 includes a heater 100, a holder **21*b*, and a fixing film 21*c*. The heater 100 is a plate-type ceramic heater. The holder 21*b* holds the heater 100. The fixing film 21*c* encloses the heater 100 and the holder 21*b*. The fixing film 21*c* serves as a fixing member and is a cylindrical film. The heater 100 further includes a thermistor 21*d*, which is provided on a side of the heater 100 that is remote from the pressure roller 22. The thermistor 21*d* is configured to control and adjust the temperature of the heater 100**.

The pressure roller 22 serves as a pressing member and is pressed against the heater 100 and the holder **21*b* with the fixing film 21*c* in between, whereby a fixing nip N is formed. At the fixing nip N, the sheet S is to be conveyed in a sheet conveying direction CD. In the first embodiment, the pressure roller 22 is urged against the heating unit 21. Alternatively, the heating unit 21 may be urged against the pressure roller 22**.

The pressure roller 22 includes an iron core bar **22*a*, an elastic layer 22*b*, and a release layer 22*c*. The elastic layer 22*b* is provided over the core bar 22*a* and is made of foamed silicone rubber. The release layer 22*c* is provided over the elastic layer 22*b*. The elastic layer 22*b* is provided between the release layer 22*c* and the core bar 22*a*. The release layer 22*c* forms the surface of the pressure roller 22** with which the sheet S comes into contact.

The release layer **22*c* of the pressure roller 22 is made of perfluoroalkoxy (PFA) resin. The release layer 22*c* is in the form of, for example, a tube that covers the elastic layer 22*b* or a coating that is applied to the elastic layer 22*b*. In the first embodiment, the release layer 22*c* is a highly durable tube that covers the elastic layer 22*b*. The release layer 22*c*** may be made of, as an alternative to PFA, fluorocarbon resin such as polytetrafluoroethylene (PTFE) or perfluoro ethylene-propylene copolymer (FEP), or a highly releasable material such as fluororubber or silicone rubber.

The fixing film **21*c* of the heating unit 21 rotates by following the pressure roller 22. At the fixing nip N, the sheet S is heated and pressurized by the heating unit 21 and the pressure roller 22, whereby the toner image on the sheet S is fixed to the sheet S. Furthermore, the sheet S is conveyed by the heating unit 21 and the pressure roller 22 to the discharge roller pair 23**.

Heater Control Circuit and Heater According to First Embodiment

Figures 3A, 3B:
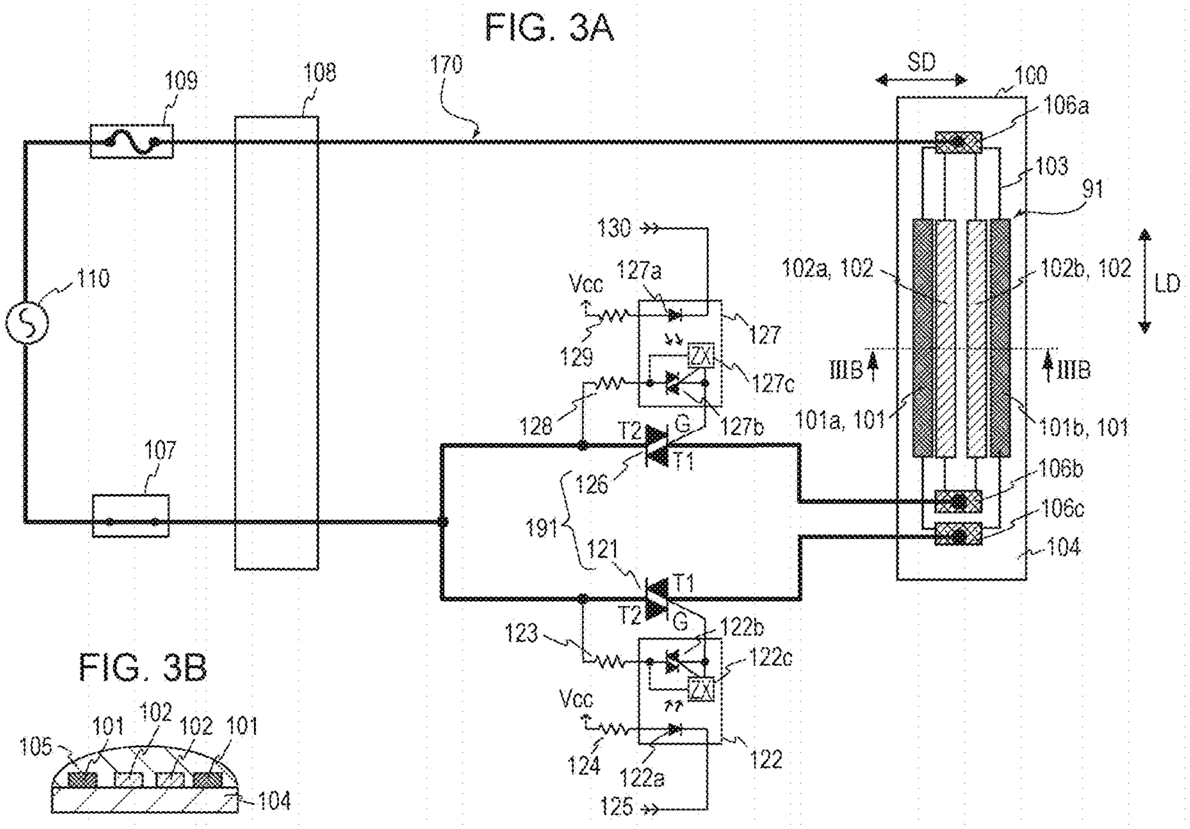
FIG. 3A illustrates a heater control circuit and a heater.
FIG. 3B illustrates a section of the heater that is taken along line IIIB-IIIB.

The first embodiment will further be described with reference to FIGS. 3A to 6B. FIG. 3A illustrates a heater control circuit 170 and the heater 100, which are included in the fixing unit 20 (see FIG. 2) according to the first embodiment. FIG. 3B illustrates a section of the heater 100 that is taken along line IIIB-IIIB.

The heater 100 illustrated in FIG. 3B includes a ceramic substrate 104, which serves as a base substrate. The heater 100 further includes heat generating elements 101 and 102, conductors 103, contact points **106*a* to 106*c*, and insulating glass 105, which are all provided on the ceramic substrate 104. The heat generating elements 101 and 102 as a whole serve as a heat generating unit 91, which is configured to generate heat when powered. The heat generating element 101 serves as a first heat generating element and includes two heat generating parts 101***a* and 101*b*, which are arranged in line symmetry in a short-side direction SD of the ceramic substrate 104. The heat generating element 101 is connected to the contact point 106*a* and the contact point 106*c*. The heat generating part 101*a* serves as a first heat generating part and is provided at one end part of the ceramic substrate 104 in the short-side direction SD, whereas the heat generating part 101*b* serves as a second heat generating part and is provided at the other end part of the ceramic substrate 104 in the short-side direction SD.

The heat generating element 102 serves as a second heat generating element and includes two heat generating parts 102*a* and 102*b*, which are arranged in line symmetry in the short-side direction SD of the ceramic substrate 104. The heat generating element 102 is connected to the contact point 106*a* and the contact point 106*b*. The heat generating part 102*a* serves as a third heat generating part. The heat generating part 102*b* serves as a fourth heat generating part. The heat generating parts 102*a* and 102*b* are arranged side by side in the short-side direction SD. The short-side direction SD is parallel to the sheet conveying direction CD (see FIG. 2). The heat generating element 102 including the heat generating parts 102*a* and 102*b* is located between the heat generating parts 101*a* and 101*b* in the short-side direction SD of the ceramic substrate 104. The heat generating parts 101*a*, 101*b*, 102*a*, and 102*b* each extend in a long-side direction LD, which is orthogonal to the short-side direction SD, and are side by side in the short-side direction SD. In the first embodiment, the heat generating elements 101 and 102 have an equal length in the long-side direction LD.

The heat generating element 101 has a smaller resistance value than the heat generating element 102. For example, the resistance value of the heat generating element 101 is about 8Ω. If a commercial alternating-current (AC) power source 110 is configured to generate a voltage of 110 V, the maximum power to be supplied to the heat generating element 101 is about 1500 W (110 V×110 V÷8Ω). The resistance value of the heat generating element 102 is, for example, about 24Ω. If the commercial AC power source 110 is configured to generate a voltage of 110 V, the maximum power to be supplied to the heat generating element 102 is about 500 W (110 V×110 V÷24Ω). The insulating glass 105 is intended to insulate the user from the heat generating elements 101 and 102, which have a substantially equal potential to the commercial AC power source 110.

As illustrated in FIG. 3A, the heater control circuit 170 for the heater 100 basically includes the commercial AC power source 110, a current fuse 109, an electromagnetic relay 107, a noise filter 108, triacs 121 and 126, and the heater 100. The triacs 121 and 126 each include main terminals T1 and T2, and a gate terminal G. The gate terminal G is provided between the main terminals T1 and T2. The application of a gate voltage to the gate terminal G switches the main terminals T1 and T2 to be electrically conductive. More specifically, the triacs 121 and 126 are each a circuit in which two thyristors are connected in parallel but opposite each other. The triacs 121 and 126 each conduct both positive and negative currents when receiving the gate voltage, and are each therefore capable of controlling the alternating current. The thyristors each include p-type semiconductors and n-type semiconductors that are stacked alternately in a total of four layers. In short, the triacs 121 and 126 are each regarded as a semiconductor switch including a plurality of semiconductors and being switchable between an electrically conductive state and an electrically nonconductive state. The triacs 121 and 126 cooperate with each other to serve as a switch unit 191, which is configured to selectively switch between a first power supply channel PSC1 and a second power supply channel PSC2 (to be described below).

The triac 121 serving as a semiconductor switch and as a first semiconductor switch is controlled on the basis of a control signal 125, which is generated by the controller 90 (see FIG. 1). A phototriac coupler 122 is provided as a switch for the triac 121. To switch the triac 121 to be conductive, the control signal 125 is set to a low level, and a light-emitting diode 122*a*, included in the phototriac coupler 122, is caused to emit light. The light-emitting diode 122*a* is connected to a direct-current (DC) power source Vcc. The DC power source Vcc has the same ground (GND) level as the controller 90 and is configured to output a direct-current voltage of, for example, 3.3 V or 24 V. A resistor 124 is provided as a current limiting resistor responsible for limiting the current that flows through the light-emitting diode 122*a* included in the phototriac coupler 122.

With the emission of light from the light-emitting diode 122*a* in the phototriac coupler 122, a triac part 122*b*, included in the phototriac coupler 122, is switched to be conductive. With the switching of the triac part 122*b* in the phototriac coupler 122 to be conductive, a current is supplied from the commercial AC power source 110 to the gate terminal G of the triac 121 through a resistor 123, whereby the triac 121 is switched to be conductive.

The phototriac coupler 122 includes a zero-crossing-detection circuit 122*c* and is configured to detect the zero crossings, or points around phase angles of 0° and 180°, of the commercial AC power source 110. Specifically, the zero-crossing-detection circuit 122*c* serves as a zero-crossing detector and is configured to detect the zero crossings of the voltage generated by the commercial AC power source 110 serving as an AC power source. The zero-crossing-detection circuit 122*c* functions such that the triac part 122*b* of the phototriac coupler 122 does not start to conduct a current unless around a zero crossing of the commercial AC power source 110. Therefore, the triac 121 does not start to conduct a current unless around a zero crossing of the commercial AC power source 110. In other words, the triac 121 is allowed to switch from the nonconductive state to the conductive state when the phase angle of the commercial AC power source 110 is around 0° or 180°, but is disallowed to switch from the nonconductive state to the conductive state when the phase angle of the commercial AC power source 110 is around 90° or 270°. The triac is an element characterized in that the triac once switched to be conductive is kept being conductive until around another zero crossing of the commercial AC power source 110.

Accordingly, the triac 121 starts to conduct a current around a zero crossing of the commercial AC power source 110 and keeps being conductive until around the next zero crossing. That is, in the first embodiment, the power supply from the commercial AC power source 110 to the heat generating element 101 of the heater 100 is controlled by the triac 121 on the basis of wave number.

The triac 126 and the driving circuit therefor operate as with the case of the triac 121. Specifically, the controller 90 (see FIG. 1) generates a control signal 130. A light-emitting diode 127*a* is included in a phototriac coupler 127 and is turned on and off on the basis of the control signal 130. The light-emitting diode 127*a* is connected to a direct-current (DC) power source Vcc through a resistor 129. With the emission of light from the light-emitting diode 127*a* in the phototriac coupler 127, a triac part 127*b* is switched to be conductive in the phototriac coupler 127. With the switching of the triac part 127*b* to be conductive in the phototriac coupler 127, a current is supplied from the commercial AC power source 110 to the gate terminal G of the triac 126 through a resistor 128, whereby the triac 126 is switched to be conductive.

The phototriac coupler 127 includes a zero-crossing-detection circuit 127*c*. The function of the zero-crossing-detection circuit 127*c* is the same as the function of the zero-crossing-detection circuit 122*c*. Specifically, the triac 126 starts to conduct a current around a zero crossing of the commercial AC power source 110 and keeps being conductive until around the next zero crossing. That is, in the first embodiment, the power supply from the commercial AC power source 110 to the heat generating element 102 of the heater 100 is controlled by the triac 126 on the basis of the wave number.

The noise filter 108 is, for example, a choke coil or a condenser and is responsible for reducing the disturbance voltage by reducing the conduction of noise from the triacs 121 and 126 to the commercial AC power source 110.

The current fuse 109 is responsible for the safety of the fixing unit 20 (see FIG. 2). If an irregular current flows through the heater control circuit 170 and the heater 100, the current fuse 109 is switched to be nonconductive and thus cuts the power supply from the commercial AC power source 110 to the heater 100.

The electromagnetic relay 107 is also responsible for the safety of the fixing unit 20. If any irregularity occurs in the heater 100, the electromagnetic relay 107 switches the contact points thereof to be nonconductive and thus cuts the power supply from the commercial AC power source 110 to the heater 100.

Figure 4A:
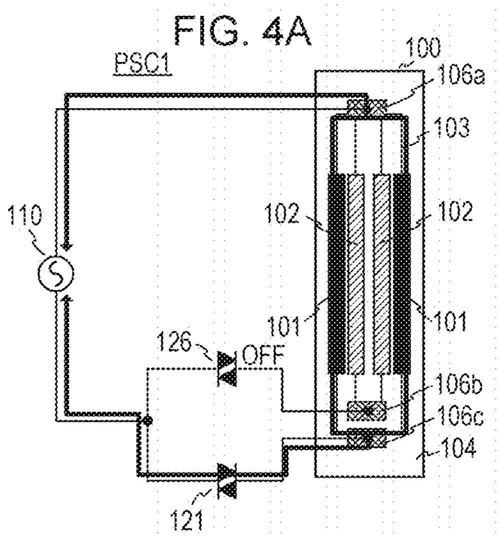
FIG. 4A is a circuit diagram illustrating a first power supply channel.
Figure 4B:
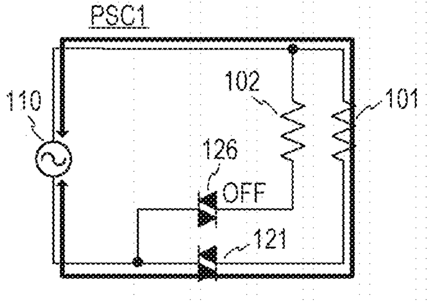
FIG. 4B illustrates a circuit equivalent to the circuit illustrated in FIG. 4A.

FIGS. 4A to 4D illustrate power supply channels to be established in the heater control circuit 170. FIGS. 4A and 4B are circuit diagrams illustrating the first power supply channel PSC1. FIG. 4A is an extract of a part of FIG. 3A that is relevant to description of the first power supply channel PSC1, which is illustrated by a bold line.

The first power supply channel PSC1 basically includes the commercial AC power source 110, the heat generating element 101, and the triac 121. FIG. 4B illustrates a circuit equivalent to the circuit illustrated in FIG. 4A, and is provided for easier understanding of the first power supply channel PSC1. In the first embodiment, as illustrated in FIG. 4B, the heat generating element 101 is connected in series to the triac 121, and the heat generating element 102 is connected in series to the triac 126. The heat generating element 101 and the triac 121 are connected in parallel to the heat generating element 102 and the triac 126. In the first embodiment, when the triac 121 is switched to be conductive while the triac 126 is kept nonconductive, the first power supply channel PSC1 is established. In the first power supply channel PSC1, the power supply from the commercial AC power source 110 to the heat generating element 101 is controlled by switching the triac 121 between the conductive state and the nonconductive state.

Figure 4C:
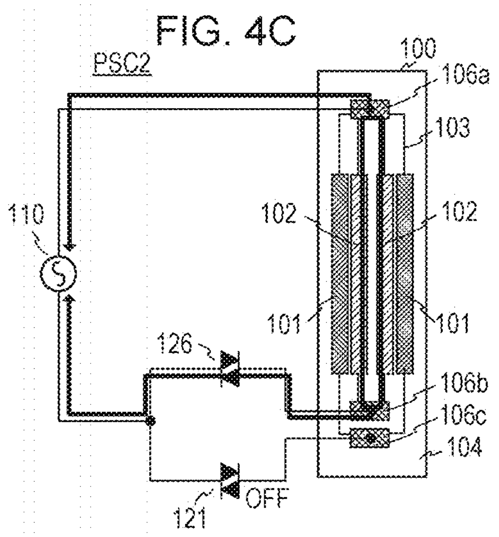
FIG. 4C is a circuit diagram illustrating a second power supply channel.
Figure 4D:
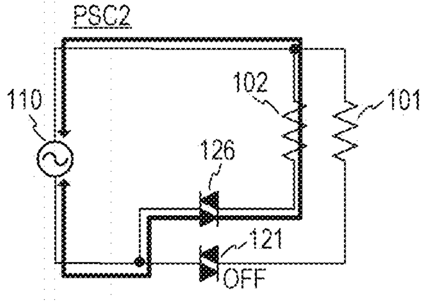
FIG. 4D illustrates a circuit equivalent to the circuit illustrated in FIG. 4B.

FIGS. 4C and 4D are circuit diagrams illustrating the second power supply channel PSC2. FIG. 4C is an extract of a part of FIG. 3A that is relevant to description of the second power supply channel PSC2, which is illustrated by a bold line.

The second power supply channel PSC2 basically includes the commercial AC power source 110, the heat generating element 102, and the triac 126. FIG. 4D illustrates a circuit equivalent to the circuit illustrated in FIG. 4C. In the second power supply channel PSC2, when the triac 126 is switched to be conductive while the triac 121 is kept nonconductive, the second power supply channel PSC2 is established. In the second power supply channel PSC2, the power supply from the commercial AC power source 110 to the heat generating element 102 is controlled by switching the triac 126 between the conductive state and the nonconductive state. In short, the first power supply channel PSC1 and the second power supply channel PSC2 are different from each other in at least one of the objects of power supply, specifically the heat generating element 101 and/or 102.

As described above, the resistance value of the heat generating element 101 is smaller than the resistance value of the heat generating element 102. Hence, the maximum power consumption is greater for the first power supply channel PSC1 than for the second power supply channel PSC2. Such a design assumes that the first power supply channel PSC1 is used when the fixing unit 20 (see FIG. 2) requires a high power, whereas the second power supply channel PSC2 is used when the fixing unit 20 does not require a power as high as for the first power supply channel PSC1.

Figure 5:
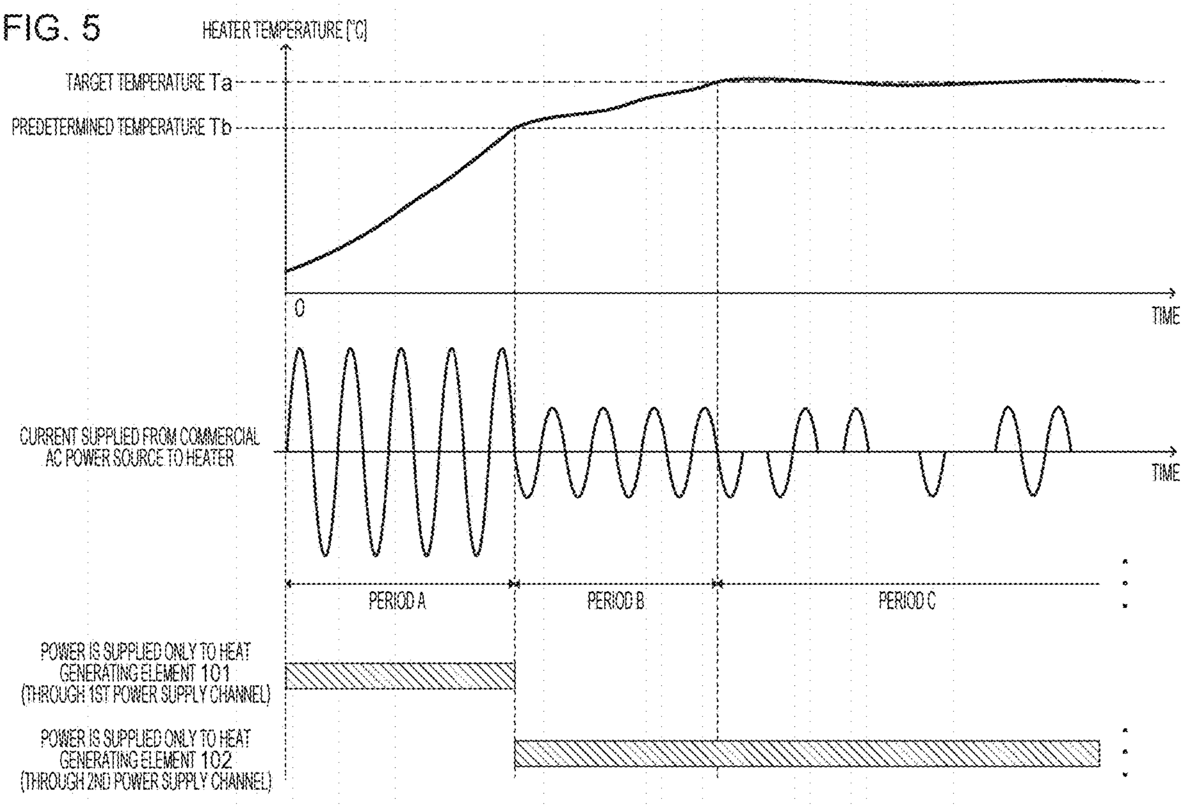
FIG. 5 illustrates how to control the temperature of the fixing unit.

FIG. 5 illustrates how to control the temperature of the fixing unit 20 (see FIG. 2) according to the first embodiment by using the first power supply channel PSC1 and the second power supply channel PSC2. At time 0 (zero) in FIG. 5, the temperature of the heater 100 is well below a target temperature Ta and a predetermined temperature Tb. For example, the target temperature Ta is about 200° C., the predetermined temperature Tb is about 180° C., and the temperature of the heater 100 at time 0 is about 25° C. To heat the heater 100 under such conditions, the triac 126 is switched to be nonconductive to establish the first power supply channel PSC1, whereby power is supplied from the commercial AC power source 110 to the heat generating element 101. This state is maintained until the temperature of the heater 100 reaches the predetermined temperature Tb. In FIG. 5, period A is the period over which the first power supply channel PSC1 is used to heat the heat generating element 101.

In period A, the triac 121 is ready to be switched between the conductive state and the nonconductive state in response to an instruction to be issued by the controller 90 (see FIG. 1) on the basis of the temperature of the heater 100. Nevertheless, since the temperature of the heater 100 in period A is far away from the target temperature Ta, the triac 121 is substantially kept conductive.

When the temperature of the heater 100 reaches the predetermined temperature Tb, the triac 121 is switched to be nonconductive to establish the second power supply channel PSC2, whereby power is supplied from the commercial AC power source 110 to the heat generating element 102. This state is maintained until the temperature of the heater 100 reaches the target temperature Ta. In FIG. 5, period B is the period over which the second power supply channel PSC2 is used to heat the heat generating element 102. It is understood that the current supplied from the commercial AC power source 110 to the heater 100 is smaller in period B than in period A. This is because, as described above, the resistance value of the second power supply channel PSC2 (the resistance value of the heat generating element 102) is greater than the resistance value of the first power supply channel PSC1 (the resistance value of the heat generating element 101). Since the current supplied from the commercial AC power source 110 to the heater 100 is smaller in period B than in period A, the rise of the temperature of the heater 100 is gentler in period B than in period A.

The use of the first power supply channel PSC1 for supplying power is not continued until the temperature of the heater 100 reaches the target temperature Ta. When the predetermined temperature Tb is reached, the channel for supplying power is switched to the second power supply channel PSC2. This is to prevent the overshoot of the temperature of the heater 100 with reference to the target temperature Ta. If prompt reaching of the target temperature Ta by the heater 100 overrides the prevention of overshoot, the use of the first power supply channel PSC1 for supplying power may be continued until the temperature of the heater 100 reaches the target temperature Ta. That is, in period B, the first power supply channel PSC1 may be used for supplying power to the heat generating element 101 of the heater 100.

Once the temperature of the heater 100 reaches the target temperature Ta, the temperature of the heater 100 is controlled by using the second power supply channel PSC2 and in such a manner as to follow the target temperature Ta. Period C is the period over which the second power supply channel PSC2 is used to control the temperature of the heater 100 to be the target temperature Ta. In other words, the switch unit 191 (see FIG. 3A) selects the first power supply channel PSC1 if the temperature of the heater 100 is below the predetermined temperature Tb, and selects the second power supply channel PSC2 if the temperature of the heater 100 is above the predetermined temperature Tb.

Figure 6A:
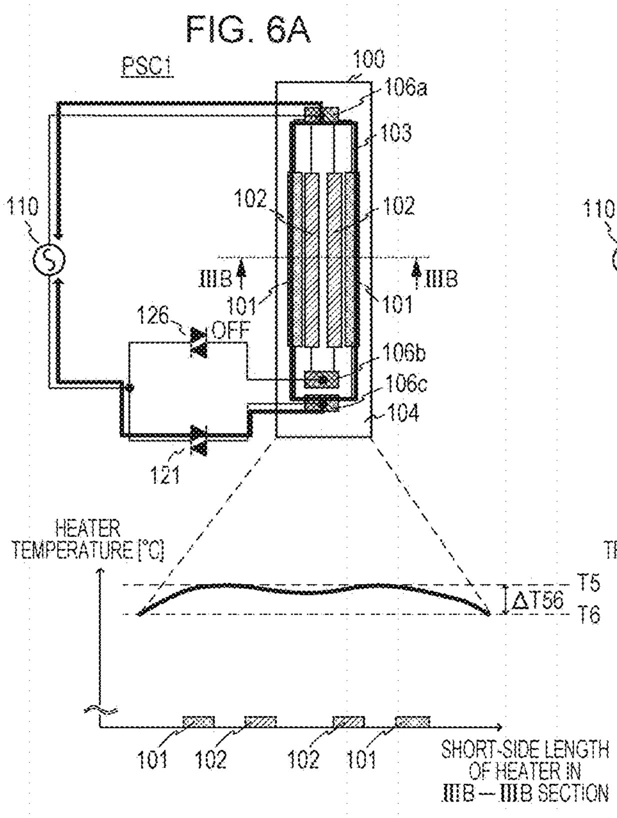
FIG. 6A illustrates a steady heat distribution of the heater in the section taken along line IIIB-IIIB and in a case where power is supplied through the first power supply channel.
Figure 6B:
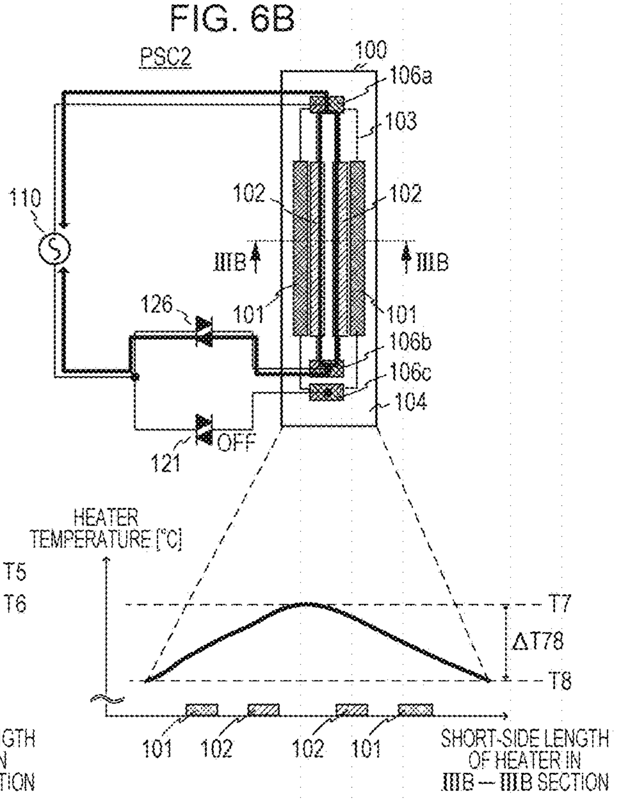
FIG. 6B illustrates a steady heat distribution of the heater in the section taken along line IIIB-IIIB and in a case where power is supplied through the second power supply channel.

FIGS. 6A and 6B each illustrate a heat distribution of the heater 100. FIG. 6A illustrates a steady heat distribution of the heater 100 in the section taken along line IIIB-IIIB and in a case where power is supplied through the first power supply channel PSC1 only to the heat generating element 101. The first power supply channel PSC1 is intended to heat only the heat generating element 101. A central part of the heater 100 in the short-side direction SD receives heat from both of the two heat generating parts 101*a* and 101*b* included in the heat generating element 101. Therefore, the temperature in the central part rises. Consequently, the heat distribution of the heater 100 in the IIIB-IIIB section becomes substantially even. In FIG. 6A, the maximum temperature of the heater 100 is denoted by T5, the minimum temperature of the heater 100 is denoted by T6, and the temperature difference between the maximum temperature T5 and the minimum temperature T6 is denoted by ΔT56.

FIG. 6B illustrates a steady heat distribution of the heater 100 in the section taken along line IIIB-IIIB and in a case where power is supplied through the second power supply channel PSC2 only to the heat generating element 102. The second power supply channel PSC2 is intended to heat only the heat generating element 102. Therefore, the temperature of the heater 100 is high in the central part in the short-side direction SD. Meanwhile, the heat tends to be released from two end parts of the heater 100 in the short-side direction SD. Therefore, the temperature in the two end parts is relatively low. Consequently, the IIIB-IIIB section of the heater 100 exhibits a heat distribution in which the temperature is high in the central part but low in the end parts in the short-side direction SD. In FIG. 6B, the maximum temperature of the heater 100 is denoted by T7, the minimum temperature of the heater 100 is denoted by T8, and the temperature difference between the maximum temperature T7 and the minimum temperature T8 is denoted by ΔT78.

The smaller the temperature difference in the heat distribution of the heater 100 in the IIIB-IIIB section, the smaller the thermal stress to the ceramic substrate 104 of the heater 100. That is, if the temperature difference in the heater 100 is small, the ceramic substrate 104 expands substantially evenly in the long-side direction LD and is less likely to be subjected to a stress (strain) that may be caused by the difference in the way of expansion of the ceramic substrate 104.

The first power supply channel PSC1 is supplied with a greater power than the second power supply channel PSC2 and causes the temperature of the heater 100 to rise quickly and reach the level of the heat distribution illustrated in FIG. 6A in a short time. The temperature difference ΔT56 in the heater 100 supplied with power through the first power supply channel PSC1 is smaller than the temperature difference ΔT78 in the heater 100 supplied with power through the second power supply channel PSC2. Therefore, the thermal stress to the ceramic substrate 104 is smaller when power is supplied to the heater 100 through the first power supply channel PSC1 than when power is supplied to the heater 100 through the second power supply channel PSC2. Thus, an increased durability is provided to the ceramic substrate 104.

Specifically, the first power supply channel PSC1 is intended for relatively high power but generates a relatively small thermal stress to the ceramic substrate 104, whereas the second power supply channel PSC2 is intended for relatively low power but generates a relatively large thermal stress to the ceramic substrate 104. That is, the ceramic substrate 104 is prevented from being subjected to a large thermal stress in a short time. Such a configuration facilitates the protection of the heater 100 with a safety device or the like (not illustrated) from any unusual event in the heater control circuit 170 that may excessively rise the temperature of the heater 100. Furthermore, since the heat distribution of the heater 100 particularly at the activation of the heater 100 is made substantially even, an increased power is supplied to the heater 100. Consequently, the FPOT is reduced. Otherwise, or if the first power supply channel PSC1 is intended for high power and generates a large thermal stress, an unusual event in the first power supply channel PSC1 may damage the heater 100 before the safety device (not illustrated) is activated.

Now, advantageous effects produced by the first embodiment will be described. Firstly, the size of the noise filter 108 is reduced. In all of periods A to C illustrated in FIG. 5, the triacs 121 and 126 operate under wave-number control in which the triacs 121 and 126 are each switched between the conductive state and the nonconductive state in units of half waves of the commercial AC power source 110. Wave-number control exerts a greater effect in reducing the disturbance voltage than phase control. Therefore, in the configuration according to the first embodiment, the size of the noise filter 108 is smaller than in the case of phase control.

Secondly, flicker is reduced. In period C, the current changes with the switching of the triac 126 between the conductive state and the nonconductive state, and flicker therefore tends to occur theoretically. Nevertheless, since the peak current in period C is smaller than the peak current in period A, flicker is less likely to occur in period C than in a case where a current with large peaks as with the case of period A is turned on and off. In period B, the current basically flows constantly, and therefore substantially no flicker occurs. In period B, the current may be turned on and off when the temperature of the heater 100 is about to reach the target temperature Ta represented in FIG. 5. Nevertheless, as with the case of period C, the peak current in period B is smaller than in period A. Therefore, flicker is less likely to occur than in a case where a current with large peaks as with the case of period A is turned on and off.

In period A, although the peak current is greater than in periods B and C, flicker is less likely to occur because the current is constantly flowing with no changes. Since the temperature of the heater 100 is controlled with the switching between the first power supply channel PSC1 and the second power supply channel PSC2 as illustrated in FIG. 5, the probability of flicker is lower in all of periods A to C than in a case where the heater control circuit 170 has only the first power supply channel PSC1.

Thirdly, the even-ordered harmonic current is reduced. In wave-number control, in general, an even-ordered harmonic current is observed. In period C, however, wave-number control is performed with a small current. Therefore, the even-ordered harmonic current is smaller than in wave-number control performed with a current as large as the current in period A. Note that no even-ordered harmonic current is observed in periods A and B, in which the current flows constantly.

Fourthly, the heater 100 is heated with no power loss and in the shortest time possible. In FIG. 5, it is understood that the current is continuous at the transition from period A to period B. That is, seamless switching from the first power supply channel PSC1 to the second power supply channel PSC2 is achieved, resulting in no power loss. In a case where power supply channels are switched by using a mechanical switch such as an electromagnetic relay, there occurs a period where the current is temporarily turned off at the switching between the power supply channels. In contrast, in the case where the triacs 121 and 126 are used as in the first embodiment, the power supply channels are switchable with no power loss. Furthermore, since the first power supply channel PSC1 and the second power supply channel PSC2 are switched therebetween by using the triacs 121 and 126, the probability of wear of relevant elements is significantly lower than in the case of using a mechanical switch. Consequently, limitations such as those for the frequency of switching between the power supply channels and for the number of times of switching between the power supply channels are eliminated.

Fifthly, the size of ripples in the temperature of the heater 100 is reduced. In general, the smaller the change in the current supplied to the heater, the smaller the ripples in the temperature of the heater. In period C according to the first embodiment, since the current to be switched is small, the size of ripples in the temperature is smaller than in a case where the current to be switched is as large as in period A. The sheet passes through the fixing unit 20 (see FIG. 2) in period C. Therefore, the smallness of ripples in the temperature in period C leads to an improved quality of the fixing unit 20.

To summarize, in the configuration according to the first embodiment, high power is supplied to the heater 100 in period A illustrated in FIG. 5 to shorten the FPOT, whereas a small current is supplied in periods B and C illustrated in FIG. 5. Such a configuration provides a fixing unit 20 that is free from disadvantages such as those related to the size of the noise filter, flicker, the harmonic current, power loss, and temperature ripples. Note that the term "FPOT" is an abbreviation of "first print-out time" and refers to a time period that is taken from when a print job is sent to the image forming apparatus 80 until a corresponding image is printed on a first sheet.

Second Embodiment

Heater Control Circuit and Heater According to Second Embodiment

Figure 7A:
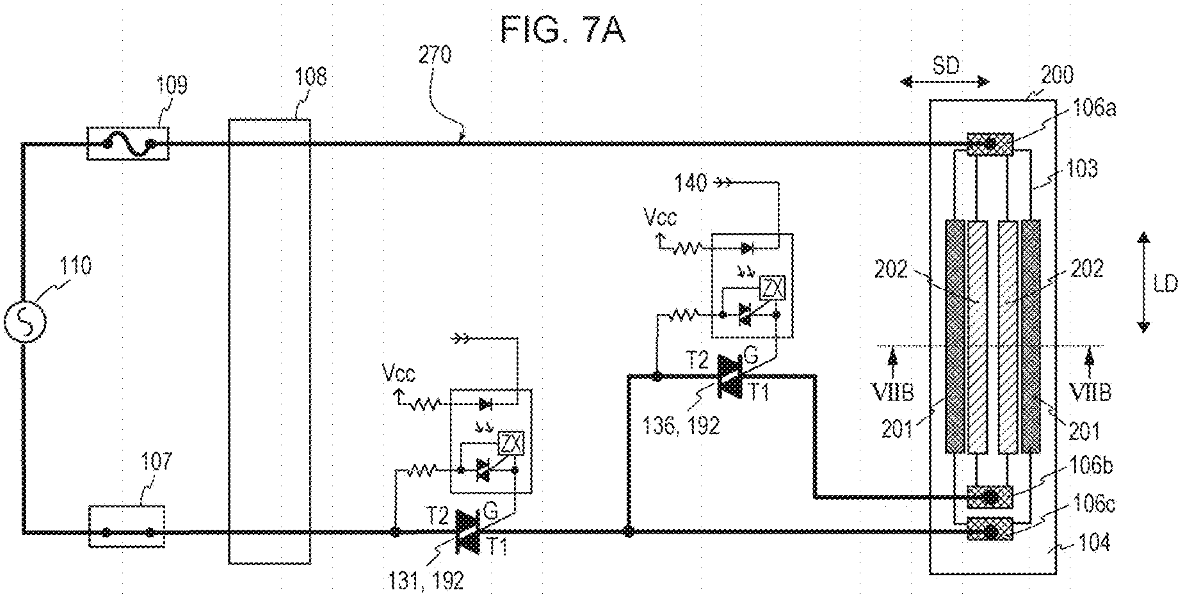
FIG. 7A illustrates a heater control circuit and a heater according to a second embodiment.
Figure 7B:
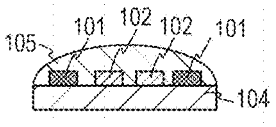
FIG. 7B illustrates a section of the heater that is taken along line VIIB-VIIB.

A second embodiment will now be described with reference to FIGS. 7A to 10B. FIG. 7A illustrates a heater control circuit 270 and a heater 200, which are included in a fixing unit 20 (see FIG. 2) according to the second embodiment. FIG. 7B illustrates a section of the heater 200 that is taken along line VIIB-VIIB.

The heater 200 illustrated in FIGS. 7A and 7B is the same as the heater 100 according to the first embodiment in the shape and some other factors thereof but is different from the heater 100 according to the first embodiment only in the resistance values of the heat generating elements. In the second embodiment, a heat generating element 201 has a resistance value of about 24Ω, and a heat generating element 202 has a resistance value of about 12Ω. The heater control circuit 270 according to the second embodiment is also different from the heater control circuit 170 according to the first embodiment. Elements that are the same as those of the first embodiment are not illustrated or are denoted by corresponding ones of the reference signs in the drawings.

As illustrated in FIG. 7A, the heater control circuit 270 for the heater 200 basically includes the commercial AC power source 110, the current fuse 109, the electromagnetic relay 107, the noise filter 108, triacs 131 and 136, and the heater 200. The triacs 131 and 136 and the driving circuit therefor operate as with the case of the triacs 121 and 126 according to the first embodiment and are therefore not described herein. The triacs 131 and 136 cooperate as a switch unit 192, which is configured to selectively switch between a third power supply channel PSC3 and a fourth power supply channel PSC4 (to be described below).

Figures 8A, 8B, 8C, 8D:
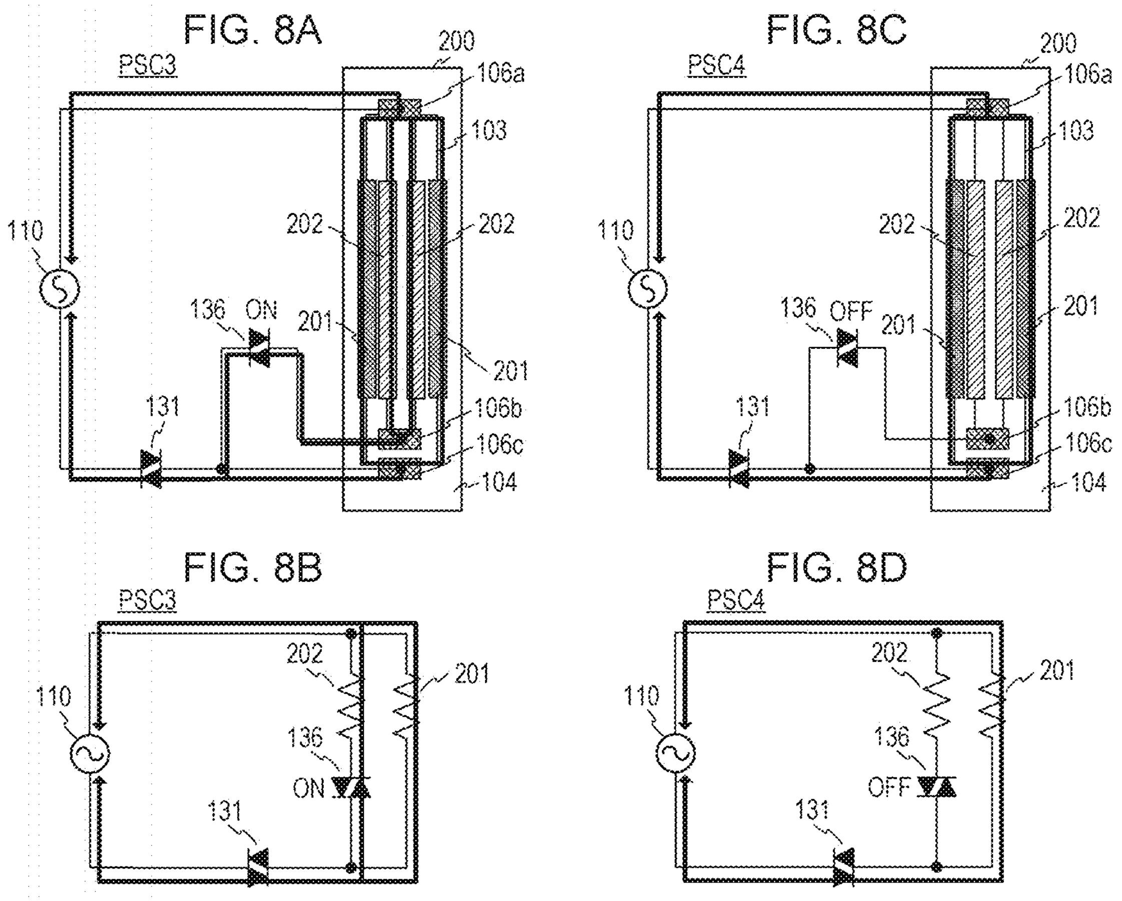
FIG. 8A is a circuit diagram illustrating a third power supply channel.
FIG. 8B illustrates a circuit equivalent to the circuit illustrated in FIG. 8A.
FIG. 8C is a circuit diagram illustrating a fourth power supply channel.
FIG. 8D illustrates a circuit equivalent to the circuit illustrated in FIG. 8B.

FIGS. 8A to 8D illustrate power supply channels to be established in the heater control circuit 270. FIGS. 8A and 8B are circuit diagrams illustrating the third power supply channel PSC3. FIG. 8A is an extract of a part of FIG. 7A that is relevant to description of the third power supply channel PSC3, which is illustrated by a bold line. The heater 200 includes the heat generating element 201, which serves as a first heat generating element; and the heat generating element 202, which serves as a second heat generating element. The third power supply channel PSC3 serves as a first power supply channel and basically includes the commercial AC power source 110, the heat generating element 201, and the triacs 131 and 136. FIG. 8B illustrates a circuit equivalent to the circuit illustrated in FIG. 8A. In the second embodiment, as illustrated in FIG. 8B, the triac 136 serves as a semiconductor switch and is connected in series to the heat generating element 202, and the heat generating element 201 is connected in parallel to the heat generating element 202 and the triac 136. In the second embodiment, when the triac 136 is kept conductive, the third power supply channel PSC3 is selected. On the other hand, when the triac 136 is kept nonconductive, the fourth power supply channel PSC4 is selected.

In the third power supply channel PSC3, the power supply from the commercial AC power source 110 to a parallel heat generating element that is formed of the heat generating elements 201 and 202 connected in parallel is controlled by switching the triac 131 between the conductive state and the nonconductive state.

FIGS. 8C and 8D are circuit diagrams illustrating the fourth power supply channel PSC4, which serves as a second power supply channel. FIG. 8C is an extract of a part of FIG. 7A that is relevant to description of the fourth power supply channel PSC4, which is illustrated by a bold line. The fourth power supply channel PSC4 basically includes the commercial AC power source 110, the heat generating element 201, and the triac 131. FIG. 8D illustrates a circuit equivalent to the circuit illustrated in FIG. 8C. In the fourth power supply channel PSC4, the power supply from the commercial AC power source 110 to the heat generating element 201 is controlled by keeping the triac 136 nonconductive and switching the triac 131 between the conductive state and the nonconductive state. In short, the third power supply channel PSC3 and the fourth power supply channel PSC4 are different from each other in at least one of the objects of power supply, specifically the heat generating element 201 and/or 202.

In the third power supply channel PSC3, since the heat generating element 201 and the heat generating element 202 are connected in parallel, the combined resistance value in the third power supply channel PSC3 is smaller than the resistance value of the heat generating element 202 in the fourth power supply channel PSC4.

In the second embodiment, the heat generating element 201 has a resistance value of 24Ω, and the heat generating element 202 has a resistance value of 12Ω. Therefore, the combined parallel resistance value of the heat generating elements 201 and 202 is 8Ω. The resistance value of the heat generating element 201 is greater than the resistance value of the heat generating element 202. In such a case, if the commercial AC power source 110 is configured to generate a voltage of 110 V, the maximum power to be supplied to the parallel heat generating element that is formed of the heat generating element 201 and the heat generating element 202 is about 1500 W (110 V×110 V÷8Ω). On the other hand, in the fourth power supply channel PSC4, the resistance value of the heat generating element 202 is 24Ω. Therefore, if the commercial AC power source 110 is configured to generate a voltage of 110 V, the maximum power to be supplied to the heat generating element 202 is about 500 W (110 V×110 V÷24Ω).

In short, the maximum power consumption is greater for the third power supply channel PSC3 than for the fourth power supply channel PSC4. Such a design assumes that the third power supply channel PSC3 is used when the fixing unit 20 (see FIG. 2) requires a high power, whereas the fourth power supply channel PSC4 is used when the fixing unit 20 does not require a power as high as for the third power supply channel PSC3.

Figure 9:
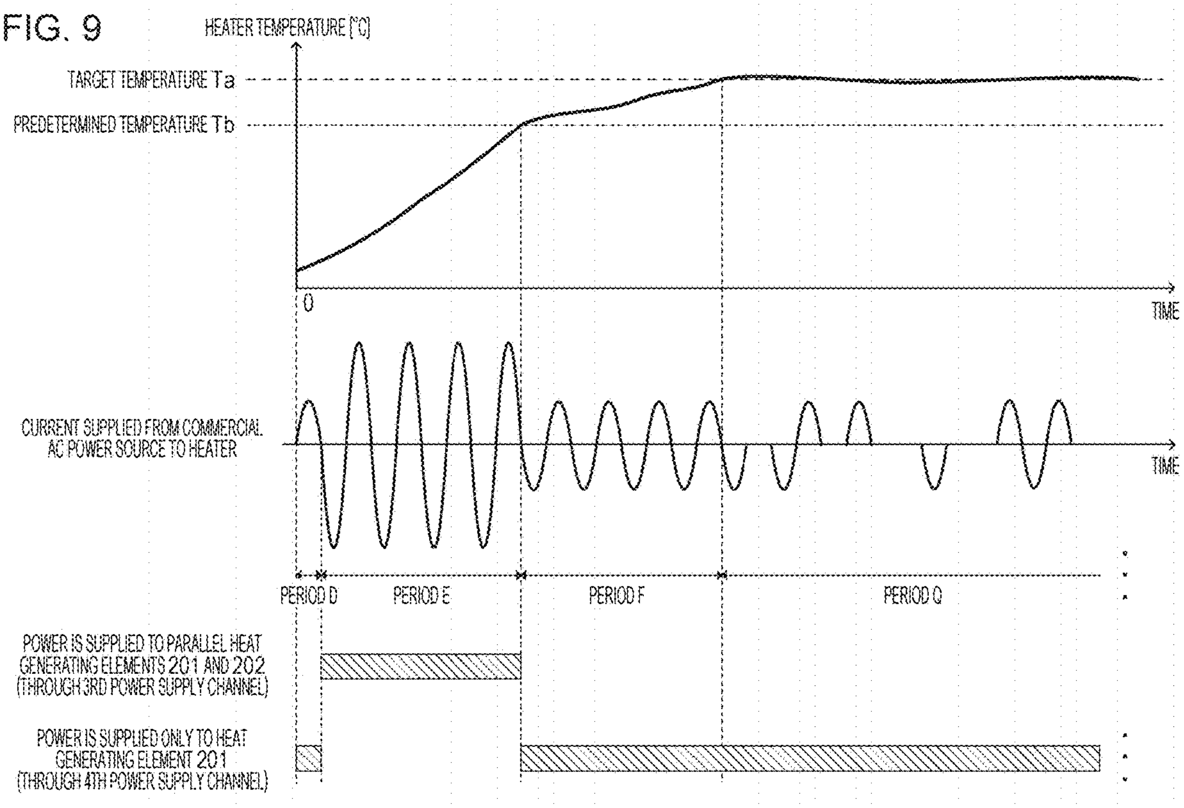
FIG. 9 illustrates how to control the temperature of the fixing unit.

FIG. 9 illustrates how to control the temperature of the fixing unit 20 (see FIG. 2) according to the second embodiment by using the third power supply channel PSC3 and the fourth power supply channel PSC4. At time 0 (zero) in FIG. 9, the temperature of the heater 200 is well below the target temperature Ta and the predetermined temperature Tb. For example, the target temperature Ta is about 200° C., the predetermined temperature Tb is about 180° C., and the temperature of the heater 200 at time 0 is about 25° C. To heat the heater 200 under such conditions, power is first supplied to the heat generating element 201 through the fourth power supply channel PSC4.

Theoretically, the supply of the higher power to the heater 200 through the third power supply channel PSC3 more quickly rises the temperature of the heater 200. In the second embodiment, however, the triac 136 is configured to follow the operation of the triac 131. Therefore, the triac 136 cannot be made conductive from the beginning of the operation (at the first one of the half waves of the commercial AC power source 110). Hence, the power supply needs to be started by using the fourth power supply channel PSC4. In FIG. 9, period D is the period over which the fourth power supply channel PSC4 is used to heat the heat generating element 201.

After the triac 131 is kept conductive for at least a half wave of the commercial AC power source 110, the triac 136 is switched to be conductive, whereby the heater 200 is heated by using the third power supply channel PSC3. In other words, if the temperature of the heater 200 is lower than the predetermined temperature Tb, the switch unit 192 (see FIG. 7A) firstly selects the fourth power supply channel PSC4 and subsequently switches the power supply channel to the third power supply channel PSC3. This state is maintained until the temperature of the heater 100 reaches the predetermined temperature Tb. In FIG. 9, period E is the period over which the third power supply channel PSC3 is used to heat the heat generating elements 201 and 202 that are connected in parallel. In period E, the triac 131 is ready to be switched between the conductive state and the nonconductive state in response to an instruction to be issued by the controller 90 (see FIG. 1) on the basis of the temperature of the heater 200. Nevertheless, since the temperature of the heater 200 in period E is far away from the target temperature Ta, the triac 131 is substantially kept conductive.

Referring to FIG. 7A, a driving signal 140 is intended for the triac 136. The driving signal 140 may be set on the basis of a logic to switch the triac 136 to be conductive at the start of period E. Alternatively, a logic to switch the triac 136 to be conductive from the beginning of period D may be set in advance. This is because the triac 136 is never switched to be conductive until the first zero crossing is reached after the triac 131 is switched to be conductive, even if the driving signal 140 for the triac 136 is set on the basis of the logic to switch the triac 136 to be conductive from the beginning of period D.

When the temperature of the heater 200 reaches the predetermined temperature Tb, the triac 136 is switched to be nonconductive to establish the fourth power supply channel PSC4, whereby power is supplied from the commercial AC power source 110 to the heat generating element 201. This state is maintained until the temperature of the heater 200 reaches the target temperature Ta. In other words, if the temperature of the heater 200 is above the predetermined temperature Tb, the switch unit 192 (see FIG. 7A) selects the fourth power supply channel PSC4. In FIG. 9, period F is the period over which the fourth power supply channel PSC4 is used to heat the heat generating element 201. It is understood that the current supplied from the commercial AC power source 110 to the heater 200 is smaller in period F than in period E. This is because, as described above, the resistance value of the fourth power supply channel PSC4 (the resistance value of the heat generating element 201) is greater than the resistance value of the third power supply channel PSC3 (the combined parallel resistance value of the heat generating elements 201 and 202). Since the current supplied from the commercial AC power source 110 to the heater 200 is smaller in period F than in period E, the rise of the temperature of the heater 200 is gentler in period F than in period E.

The use of the third power supply channel PSC3 for supplying power is not continued until the temperature of the heater 200 reaches the target temperature Ta. When the predetermined temperature Tb is reached, the channel for supplying power is switched to the fourth power supply channel PSC4. This is to prevent the overshoot of the temperature of the heater 200 with reference to the target temperature Ta. If prompt reaching of the target temperature Ta by the heater 200 overrides the prevention of overshoot, the use of the third power supply channel PSC3 for supplying power may be continued until the temperature of the heater 200 reaches the target temperature Ta. That is, in period F, the third power supply channel PSC3 may be used for supplying power to the heat generating element 201 of the heater 200.

Once the temperature of the heater 200 reaches the target temperature Ta, the temperature of the heater 200 is controlled by using the fourth power supply channel PSC4 and in such a manner as to follow the target temperature Ta. In FIG. 9, period Q is the period over which the fourth power supply channel PSC4 is used to control the temperature of the heater 200 to be the target temperature Ta.

Figure 10A:
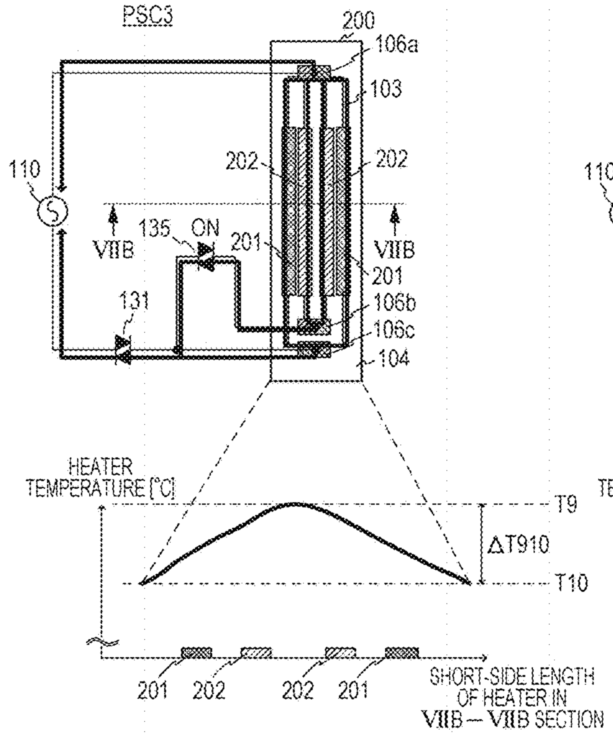
FIG. 10A illustrates a steady heat distribution of the heater in the section taken along line VIIB-VIIB and in a case where power is supplied through the third power supply channel.
Figure 10B:
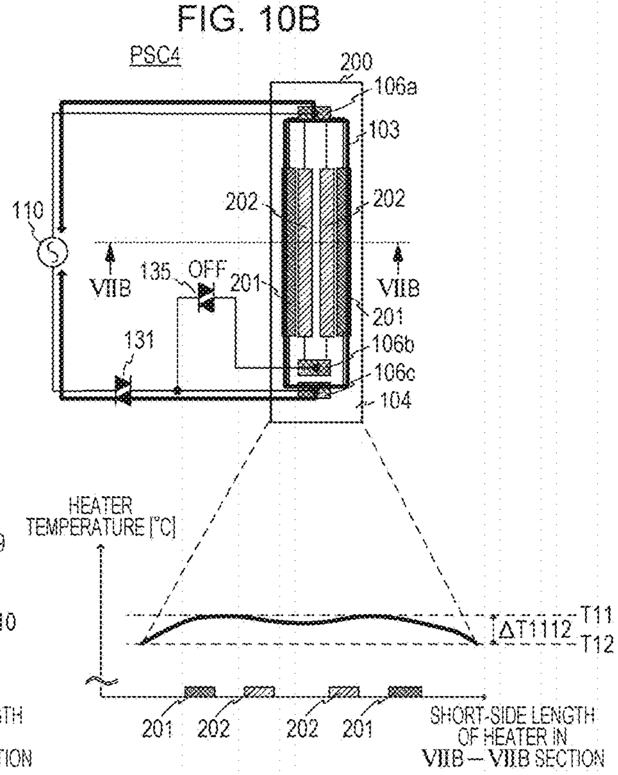
FIG. 10B illustrates a steady heat distribution of the heater in the section taken along line VIIB-VIIB and in a case where power is supplied through the fourth power supply channel.

FIGS. 10A and 10B each illustrate a heat distribution of the heater 200. FIG. 10A illustrates a steady heat distribution of the heater 200 in the section taken along line VIIB-VIIB and in a case where power is supplied through the third power supply channel PSC3 to the heat generating elements 201 and 202 that are connected in parallel. The third power supply channel PSC3 is intended to heat the heat generating elements 201 and 202. Therefore, the temperature of the heater 200 becomes highest in a central part in the short-side direction SD where heat generated from all of the heat generating parts concentrates.

In FIG. 10A, the maximum temperature of the heater 200 is denoted by T9, the minimum temperature of the heater 200 is denoted by T10, and the temperature difference between the maximum temperature T9 and the minimum temperature T10 is denoted by ΔT910.

FIG. 10B illustrates a steady heat distribution of the heater 200 in the section taken along line VIIB-VIIB and in a case where power is supplied through the fourth power supply channel PSC4 only to the heat generating element 201. The fourth power supply channel PSC4 is intended to heat only the heat generating element 201. A central part of the heater 200 in the short-side direction SD receives heat from both of the two heat generating parts included in the heat generating element 201. Therefore, the temperature in the central part rises.

Consequently, the heat distribution in the VIIB-VIIB section becomes substantially even. In FIG. 10B, the maximum temperature of the heater 200 is denoted by T11, the minimum temperature of the heater 200 is denoted by T12, and the temperature difference between the maximum temperature T11 and the minimum temperature T12 is denoted by ΔT1112.

The smaller the temperature difference in the heat distribution of the heater 200 in the VIIB-VIIB section, the smaller the thermal stress to the ceramic substrate 104 of the heater 200. That is, if the temperature difference in the heater 200 is small, the ceramic substrate 104 expands substantially evenly in the long-side direction LD and is less likely to be subjected to a stress (strain) that may be caused by the difference in the way of expansion of the ceramic substrate 104.

The temperature difference ΔT1112 in the heater 200 supplied with power through the fourth power supply channel PSC4 is smaller than the temperature difference ΔT910 in the heater 200 supplied with power through the third power supply channel PSC3. Therefore, the thermal stress to the ceramic substrate 104 is smaller when power is supplied to the heater 200 through the fourth power supply channel PSC4 than when power is supplied to the heater 200 through the third power supply channel PSC3.

Comparing the total time over which the third power supply channel PSC3 is used and the total time over which the fourth power supply channel PSC4 is used, the total time over which the fourth power supply channel PSC4 is used is longer by about two to three folds in a case where only one sheet is passed through the fixing unit 20 (see FIG. 2), and by about tens to thousands of folds in a case where a plurality of sheets are passed through the fixing unit 20. Therefore, in the second embodiment, the stress to the ceramic substrate 104 in the fourth power supply channel PSC4, which is to be used over a long time, is made small. Thus, increased reliability is provided to the fixing unit 20. Furthermore, since the heat distribution of the heater 200 particularly in period F is made substantially even, an increased power is supplied to the heater 200. Consequently, the FPOT is reduced.

If the triacs 131 and 136 according to the second embodiment both fail by simultaneously causing a short circuit, the third power supply channel PSC3 is used to supply power to the heater 200, to a maximum power of 1500 W. That is, even in case of an emergency where the plurality of triacs 131 and 136 cause a simultaneous short-circuit failure, one of the power supply channels to be used in normal times is selected.

On the other hand, if the triacs 121 and 126 according to the first embodiment cause a simultaneous short-circuit failure, a high power of 2016 W (110 V×110 V÷6Ω) is supplied to the parallel heat generating element (6Ω, for example) that is formed of the heat generating elements 101 and 102. Such a situation implies that if the plurality of triacs cause a simultaneous short-circuit failure, the configuration according to the second embodiment provides higher safety than the configuration according to the first embodiment.

The second embodiment produces the same advantageous effects as the first embodiment. Specifically, employing the configuration according to the second embodiment firstly reduces the size of the noise filter 108, secondly reduces flicker, thirdly reduces the even-ordered harmonic current, fourthly enables heating of the heater with no power loss and in the shortest time possible, and fifthly reduces the size of ripples in the temperature of the heater 200.

While the second embodiment relates to a case where the resistance value of the heat generating element 201 (about 24Ω) is greater than the resistance value of the heat generating element 202 (about 12Ω), the relationship between the resistance values is not limited thereto. According to the second embodiment, setting the resistance value of the heat generating element 201 greater than the resistance value of the heat generating element 202 produces greater advantageous effects (leading to further contribution to the reduction of the FPOT). Nevertheless, the advantageous effects of the present disclosure are produced even if the resistance value of the heat generating element 201 is set equal to the resistance value of the heat generating element 202 or even if the resistance value of the heat generating element 201 is set smaller than the resistance value of the heat generating element 202. Therefore, the relationship between the resistance values of the heat generating elements 201 and 202 does not limit the configuration set forth for the second embodiment.

Third Embodiment

Heater Control Circuit and Heater According to Third Embodiment

A third embodiment will now be described with reference to FIGS. 11A to 14B.

Figure 11A:
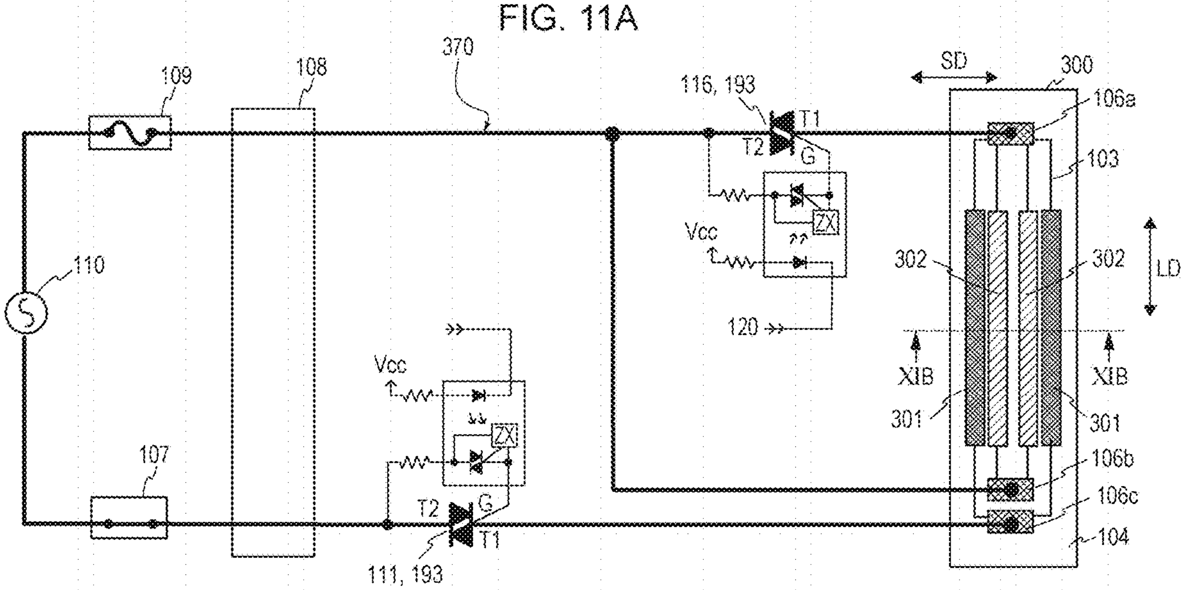
FIG. 11A illustrates a heater control circuit and a heater according to a third embodiment.

FIG. 11A illustrates a heater control circuit 370 and a heater 300, which are included in a fixing unit 20 (see FIG.

Figure 11B:
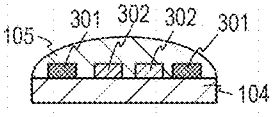
FIG. 11B illustrates a section of the heater that is taken along line XIB-XIB.

2) according to the third embodiment. FIG. 11B illustrates a section of the heater 300 that is taken along line XIB-XIB.

The heater 300 illustrated in FIGS. 11A and 11B is the same as the heater 100 according to the first embodiment in the shape and some other factors thereof but is different from the heater 100 according to the first embodiment only in the resistance values of the heat generating elements. In the third embodiment, a heat generating element 301 has a resistance value of about 8Ω, and a heat generating element 302 has a resistance value of about 16Ω. The heater control circuit 370 according to the third embodiment is also different from the heater control circuit 170 according to the first embodiment. Elements that are the same as those of the first embodiment are not illustrated or are denoted by corresponding ones of the reference signs in the drawings.

As illustrated in FIG. 11A, the heater control circuit 370 for the heater 300 basically includes the commercial AC power source 110, the current fuse 109, the electromagnetic relay 107, the noise filter 108, triacs 111 and 116, and the heater 300. The heater 300 includes the heat generating element 301, which serves as a first heat generating element; and the heat generating element 302, which serves as a second heat generating element. The triacs 111 and 116 and the driving circuit therefor operate as with the case of the triacs 121 and 126 according to the first embodiment and are therefore not described herein. The triacs 121 and 126 cooperate as a switch unit 193, which is configured to selectively switch between a fifth power supply channel PSC5 and a sixth power supply channel PSC6 (to be described below).

Figure 12A:
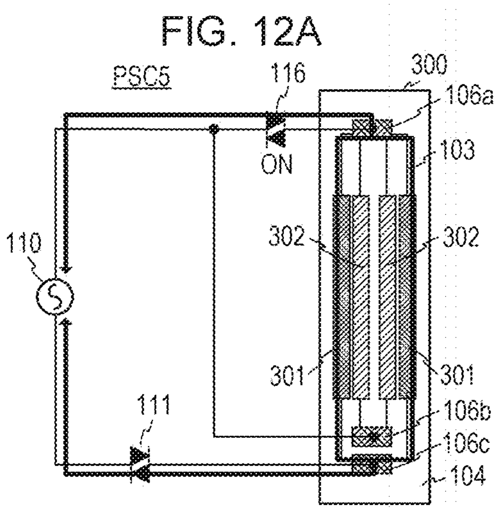
FIG. 12A is a circuit diagram illustrating a fifth power supply channel.
Figure 12C:
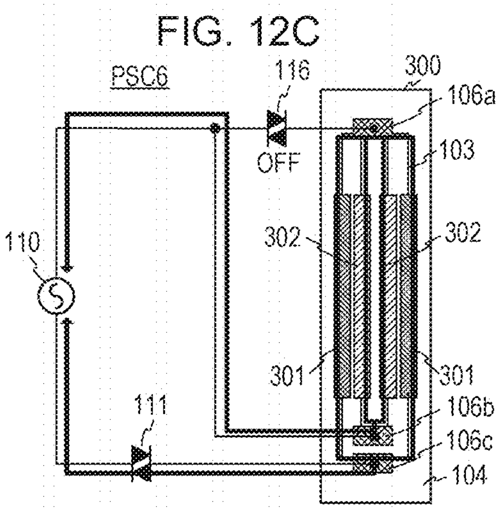
FIG. 12C is a circuit diagram illustrating a sixth power supply channel.
Figure 12B:
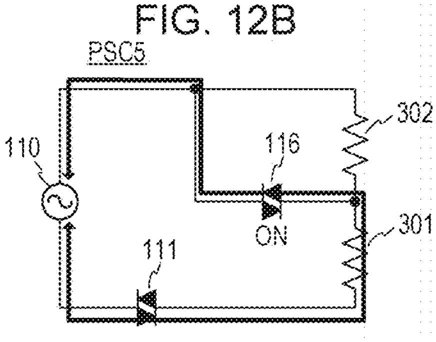
FIG. 12B illustrates a circuit equivalent to the circuit illustrated in FIG. 12A.

FIGS. 12A to 12D illustrate power supply channels to be established in the heater control circuit 270. FIGS. 12A and 12B are circuit diagrams illustrating the fifth power supply channel PSC5. FIG. 12A is an extract of a part of FIG. 11A that is relevant to description of the fifth power supply channel PSC5, which is illustrated by a bold line. The fifth power supply channel PSC5 serves as a first power supply channel and basically includes the commercial AC power source 110, the heat generating element 301, and the triacs 111 and 116. FIG. 12B illustrates a circuit equivalent to the circuit illustrated in FIG. 12A. In the third embodiment, as illustrated in FIG. 12B, the triac 116 is connected in parallel to the heat generating element 302, and the heat generating element 301 is connected in series to the triac 116 and the heat generating element 302 that are connected in parallel. In the third embodiment, when the triac 116 is kept conductive, the fifth power supply channel PSC5 is selected. In this state, the heat generating element 302 is bypassed by using the triac 116. Thus, power is supplied only to the heat generating element 301. In the fifth power supply channel PSC5, the power supply from the commercial AC power source 110 to the heat generating element 301 is controlled by switching the triac 111 between the conductive state and the nonconductive state.

Figure 12D:
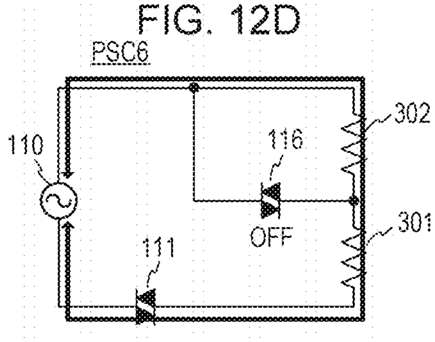
FIG. 12D illustrates a circuit equivalent to the circuit illustrated in FIG. 12B.

FIGS. 12C and 12D are circuit diagrams illustrating the sixth power supply channel PSC6, which serves as a second power supply channel. FIG. 12C is an extract of a part of FIG. 11A that is relevant to description of the sixth power supply channel PSC6, which is illustrated by a bold line. The sixth power supply channel PSC6 basically includes the commercial AC power source 110, the heat generating element 301, the heat generating element 302, and the triac 111. FIG. 12D illustrates a circuit equivalent to the circuit illustrated in FIG. 12C. In the third embodiment, when the triac 116 is kept nonconductive, the sixth power supply channel PSC6 is selected. In the sixth power supply channel PSC6, the power supply from the commercial AC power source 110 to the heat generating elements 301 and 302 connected in series is controlled by switching the triac 111 between the conductive state and the nonconductive state. In short, the fifth power supply channel PSC5 and the sixth power supply channel PSC6 are different from each other in at least one of the objects of power supply, specifically the heat generating element 301 and/or 302.

In the sixth power supply channel PSC6, since the heat generating element 301 and the heat generating element 302 are connected in series, the combined resistance value in the sixth power supply channel PSC6 is greater than the resistance value of the heat generating element 301 in the fifth power supply channel PSC5.

In the third embodiment, the resistance value of the heat generating element 301 is 8Ω, and the resistance value of the heat generating element 302 is 16Ω. Therefore, the combined series resistance value of the heat generating elements 301 and 302 is 24Ω. In such a case, if the commercial AC power source 110 is configured to generate a voltage of 110 V, the maximum power to be supplied to the set of the heat generating elements 301 and 302 that are connected in series is about 500 W (110 V×110 V÷24Ω). That is, the resistance value of the heat generating element 301 is smaller than the resistance value of the heat generating element 302. On the other hand, in the fifth power supply channel PSC5, the resistance value of the heat generating element 301 is 8Ω. Therefore, if the commercial AC power source 110 is configured to generate a voltage of 110 V, the maximum power to be supplied to the heat generating element 301 is about 1500 W (110 V×110 V÷8Ω).

In short, the maximum power consumption is smaller for the sixth power supply channel PSC6 than for the fifth power supply channel PSC5. Such a design assumes that the fifth power supply channel PSC5 is used when the fixing unit 20 (see FIG. 2) requires a high power, whereas the sixth power supply channel PSC6 is used when the fixing unit 20 does not require a power as high as for the fifth power supply channel PSC5.

Figure 13:
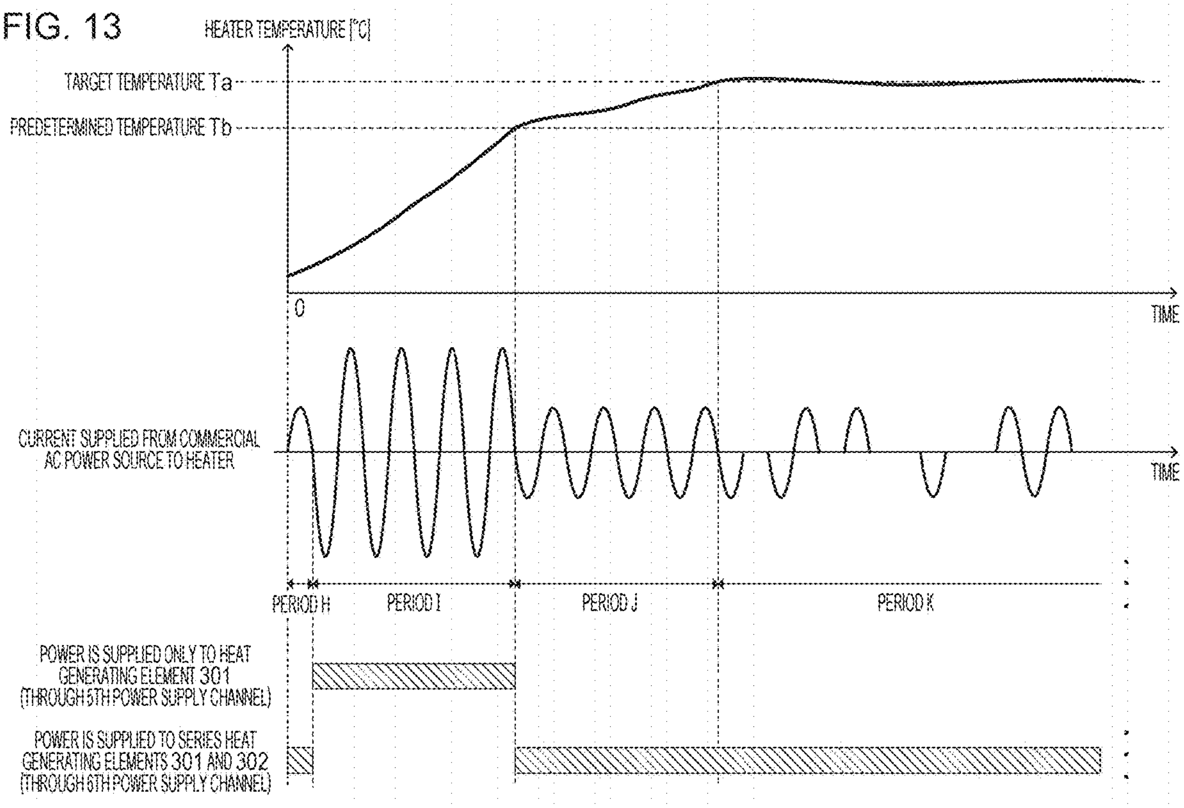
FIG. 13 illustrates how to control the temperature of the fixing unit.

FIG. 13 illustrates how to control the temperature of the fixing unit 20 (see FIG. 2) according to the third embodiment by using the fifth power supply channel PSC5 and the sixth power supply channel PSC6. At time 0 (zero) in FIG. 13, the temperature of the heater 300 is well below the target temperature Ta and the predetermined temperature Tb. For example, the target temperature Ta is about 200° C., the predetermined temperature Tb is about 180° C., and the temperature of the heater 300 at time 0 is about 25° C. To heat the heater 300 under such conditions, power is first supplied to the heat generating elements 301 and 302, which are connected in series, through the sixth power supply channel PSC6.

Theoretically, the supply of the higher power to the heater 300 through the fifth power supply channel PSC5 more quickly rises the temperature of the heater 300. In the third embodiment, however, the triac 116 is configured to follow the operation of the triac 111. Therefore, the triac 116 cannot be made conductive from the beginning of the operation (at the first one of the half waves of the commercial AC power source 110). Hence, the power supply needs to be started by using the sixth power supply channel PSC6. In FIG. 13, period H is the period over which the sixth power supply channel PSC6 is used to heat the heat generating elements 301 and 302 that are connected in series.

After the triac 111 is kept conductive for at least a half wave of the commercial AC power source 110, the triac 116 is switched to be conductive, whereby the heater 300 is heated by using the fifth power supply channel PSC5. In other words, if the temperature of the heater 300 is lower than the predetermined temperature Tb, the switch unit 193 (see FIG. 11A) firstly selects the sixth power supply channel PSC6 and subsequently switches the power supply channel to the fifth power supply channel PSC5. It can also be said that the switch unit 193 has period I for selecting the fifth power supply channel PSC5 if the temperature of the heater 300 is lower than the predetermined temperature Tb. This state is maintained until the temperature of the heater 300 reaches the predetermined temperature Tb. In FIG. 13, period I is the period over which the fifth power supply channel PSC5 is used to heat the heat generating element 301 of the heater 300. In period I, the triac 111 is ready to be switched between the conductive state and the nonconductive state in response to an instruction to be issued by the controller 90 (see FIG. 1) on the basis of the temperature of the heater 300.

Nevertheless, since the temperature of the heater 300 in period I is far away from the target temperature Ta, the triac 111 is substantially kept conductive.

Referring to FIG. 11A, a driving signal 120 is intended for the triac 116. The driving signal 120 may be set on the basis of a logic to switch the triac 116 to be conductive at the start of period I. Alternatively, a logic to switch the triac 116 to be conductive from the beginning of period H may be set in advance. This is because the triac 116 is never switched to be conductive until the first zero crossing is reached after the triac 111 is switched to be conductive, even if the driving signal 120 for the triac 116 is set on the basis of the logic to switch the triac 116 to be conductive from the beginning of period H.

When the temperature of the heater 300 reaches the predetermined temperature Tb, the triac 116 is switched to be nonconductive to establish the sixth power supply channel PSC6, whereby power is supplied from the commercial AC power source 110 to the heat generating elements 301 and 302. This state is maintained until the temperature of the heater 300 reaches the target temperature Ta. In other words, if the temperature of the heater 300 is above the predetermined temperature Tb, the switch unit 193 (see FIG. 11A) selects the sixth power supply channel PSC6. In FIG. 13, period J is the period over which the sixth power supply channel PSC6 is used to heat the heat generating elements 301 and 302. It is understood that the current supplied from the commercial AC power source 110 to the heater 300 is smaller in period J than in period I. This is because, as described above, the resistance value of the sixth power supply channel PSC6 (the combined series resistance value of the heat generating element 301 and the heat generating element 302) is greater than the resistance value of the fifth power supply channel PSC5 (the resistance value of the heat generating element 301). Since the current supplied from the commercial AC power source 110 to the heater 300 is smaller in period J than in period I, the rise of the temperature of the heater 300 is gentler in period J than in period I.

The use of the fifth power supply channel PSC5 for supplying power is not continued until the temperature of the heater 300 reaches the target temperature Ta. When the predetermined temperature Tb is reached, the channel for supplying power is switched to the sixth power supply channel PSC6. This is to prevent the overshoot of the temperature of the heater 300 with reference to the target temperature Ta. If prompt reaching of the target temperature Ta by the heater 300 overrides the prevention of overshoot, the use of the fifth power supply channel PSC5 for supplying power may be continued until the temperature of the heater 300 reaches the target temperature Ta. That is, in period J, the fifth power supply channel PSC5 may be used for supplying power to the heat generating element 301 of the heater 300.

Once the temperature of the heater 300 reaches the target temperature Ta, the temperature of the heater 300 is controlled by using the sixth power supply channel PSC6 and in such a manner as to follow the target temperature Ta. In FIG. 13, period K is the period over which the sixth power supply channel PSC6 is used to control the temperature of the heater 300 to be the target temperature Ta.

Figure 14A:
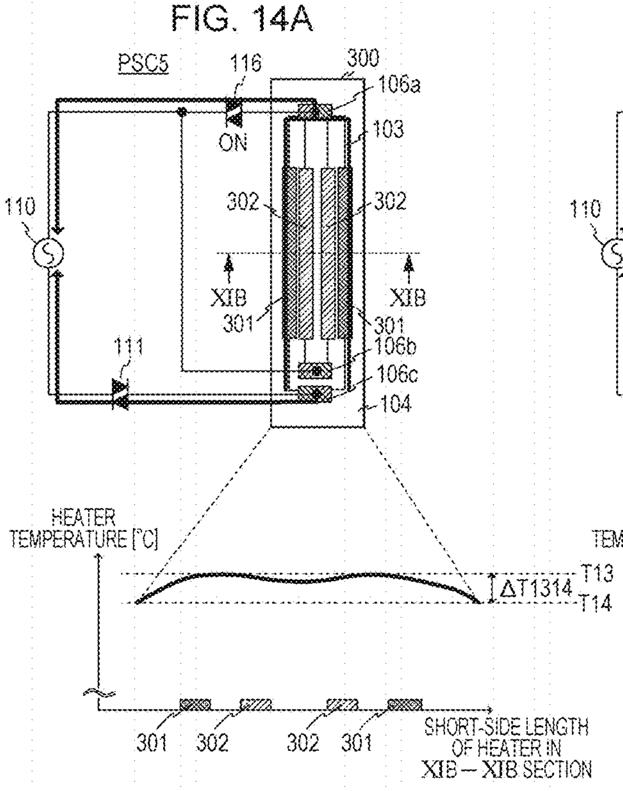
FIG. 14A illustrates a steady heat distribution of the heater in the section taken along line XIB-XIB and in a case where power is supplied through the fifth power supply channel.
Figure 14B:
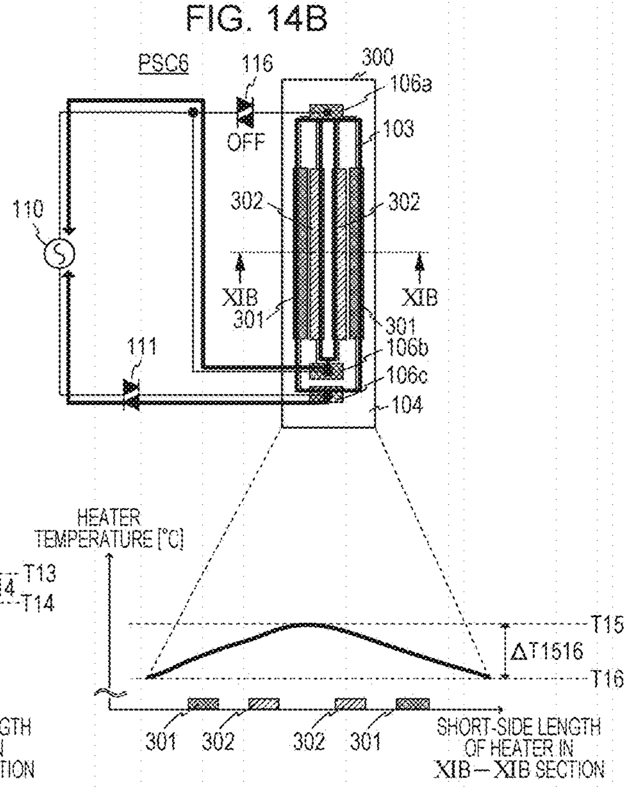
FIG. 14B illustrates a steady heat distribution of the heater in the section taken along line XIB-XIB and in a case where power is supplied through the sixth power supply channel.

FIGS. 14A and 14B each illustrate a heat distribution of the heater 300. FIG. 14A illustrates a steady heat distribution of the heater 300 in the section taken along line XIB-XIB and in a case where power is supplied through the fifth power supply channel PSC5 only to the heat generating element 301. The fifth power supply channel PSC5 is intended to heat only the heat generating element 301. A central part of the heater 300 in the short-side direction SD receives heat from both of the two heat generating parts included in the heat generating element 301. Therefore, the temperature in the central part rises. Consequently, the heat distribution in the XIB-XIB section becomes substantially even. In FIG. 14A, the maximum temperature of the heater 300 is denoted by T13, the minimum temperature of the heater 300 is denoted by T14, and the temperature difference between the maximum temperature T13 and the minimum temperature T14 is denoted by ΔT1314.

FIG. 14B illustrates a steady heat distribution of the heater 300 in the section taken along line XIB-XIB and in a case where power is supplied through the sixth power supply channel PSC6 to the heat generating elements 301 and 302 that are connected in series. The sixth power supply channel PSC6 is intended to heat the heat generating element 301 and the heat generating element 302. Therefore, the temperature of the heater 300 becomes highest in a central part in the short-side direction SD where heat generated from all of the heat generating parts concentrates. In FIG. 14B, the maximum temperature of the heater 300 is denoted by T15, the minimum temperature of the heater 300 is denoted by T16, and the temperature difference between the maximum temperature T15 and the minimum temperature T16 is denoted by ΔT1516.

The smaller the temperature difference in the heater 300 in the XIB-XIB section, the smaller the thermal stress to the ceramic substrate 104 of the heater 300. That is, if the temperature difference in the heater 300 is small, the ceramic substrate 104 expands substantially evenly in the long-side direction LD and is less likely to be subjected to a stress (strain) that may be caused by the difference in the way of expansion of the ceramic substrate 104.

The temperature difference ΔT1314 in the heater 300 supplied with power through the fifth power supply channel PSC5 is smaller than the temperature difference ΔT1516 in the heater 300 supplied with power through the sixth power supply channel PSC6. Therefore, the thermal stress to the ceramic substrate 104 is smaller when power is supplied to the heater 300 through the fifth power supply channel PSC5 than when power is supplied to the heater 300 through the sixth power supply channel PSC6. Thus, an increased durability is provided to the ceramic substrate 104.

Specifically, the fifth power supply channel PSC5 is intended for relatively high power but generates a relatively small thermal stress to the ceramic substrate 104, whereas the sixth power supply channel PSC6 is intended for relatively low power but generates a relatively large thermal stress to the ceramic substrate 104. That is, the ceramic substrate 104 is prevented from being subjected to a large thermal stress in a short time. Such a configuration facilitates the protection of the heater 300 with a safety device or the like (not illustrated) from any unusual event in the heater control circuit 370 that may excessively rise the temperature of the heater 300. Furthermore, since the heat distribution of the heater 300 particularly at the activation of the heater 300 is made substantially even, an increased power is supplied to the heater 300. Consequently, the FPOT is reduced.

If the triacs 111 and 116 according to the third embodiment both fail by simultaneously causing a short circuit, the fifth power supply channel PSC5 is used to supply power to the heater 300, to a maximum power of 1500 W. That is, even in case of an emergency where the plurality of triacs 111 and 116 fail, one of the power supply channels to be used in normal times is simply selected.

On the other hand, if the triacs 121 and 126 according to the first embodiment cause a simultaneous short-circuit failure, a high power of 2016 W (110 V×110 V÷6Ω) is supplied to the parallel heat generating element (6Ω, for example) formed of the heat generating elements 101 and 102. Such a situation implies that if the plurality of triacs fail simultaneously, the configuration according to the third embodiment provides higher safety than the configuration according to the first embodiment.

Now, the second embodiment and the third embodiment will be compared in terms of a simultaneous short-circuit failure of the plurality of triacs. If the triacs 111 and 116 according to the third embodiment cause a simultaneous short-circuit failure, the fifth power supply channel PSC5 is used to supply power to the heater 300. Accordingly, the heater 300 exhibits the temperature difference ΔT1314 as illustrated in FIG. 14A. On the other hand, if the triacs 131 and 136 according to the second embodiment cause a simultaneous short-circuit failure, the third power supply channel PSC3 is used to supply power to the heater 200. Accordingly, the heater 200 exhibits the temperature difference ΔT910 as illustrated in FIG. 10A. The temperature difference ΔT1314 is smaller than the temperature difference ΔT910. Therefore, the thermal stress to the ceramic substrate 104 in case of a simultaneous short-circuit failure of the triacs is smaller in the third embodiment than in the second embodiment. That is, the configuration according to the third embodiment is superior to the configurations according to the first embodiment and the second embodiment in terms of safety in case of a simultaneous short-circuit failure of the plurality of triacs.

The third embodiment produces the same advantageous effects as the first and second embodiments. Specifically, employing the configuration according to the third embodiment firstly reduces the size of the noise filter 108, secondly reduces flicker, thirdly reduces the even-ordered harmonic current, fourthly enables heating of the heater 300 with no power loss and in the shortest time possible, and fifthly reduces the size of ripples in the temperature of the heater 300.

While the third embodiment relates to a case where the resistance value of the heat generating element 301 (about 8Ω) is smaller than the resistance value of the heat generating element 302 (about 16Ω), the relationship between the resistance values is not limited thereto. According to the third embodiment, setting the resistance value of the heat generating element 301 smaller than the resistance value of the heat generating element 302 produces greater advantageous effects (leading to further contribution to the reduction of the FPOT). Nevertheless, the advantageous effects of the present disclosure are produced even if the resistance value of the heat generating element 301 is set equal to the resistance value of the heat generating element 302 or even if the resistance value of the heat generating element 301 is set greater than the resistance value of the heat generating element 302. Therefore, the relationship between the resistance values of the heat generating elements 301 and 302 does not limit the configuration set forth for the third embodiment.

Fourth Embodiment

Heater Control Circuit and Heater According to Fourth Embodiment

Figure 15A:
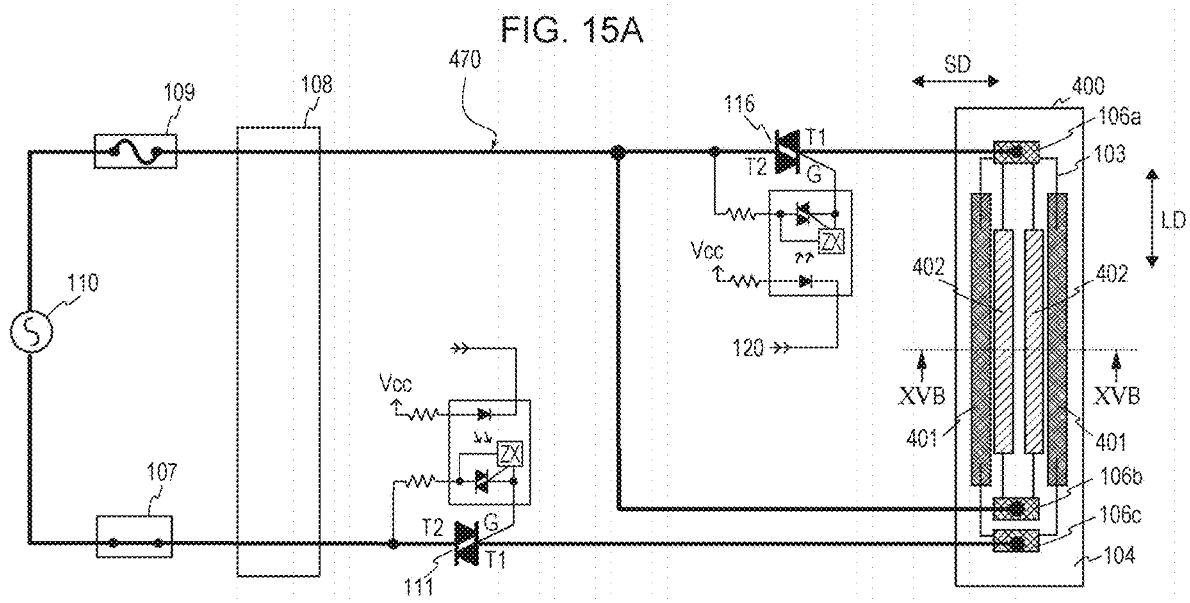
FIG. 15A illustrates a heater control circuit and a heater according to a fourth embodiment.
Figure 15B:
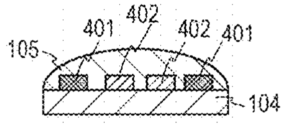
FIG. 15B illustrates a section of the heater that is taken along line XVB-XVB.
Figure 16:
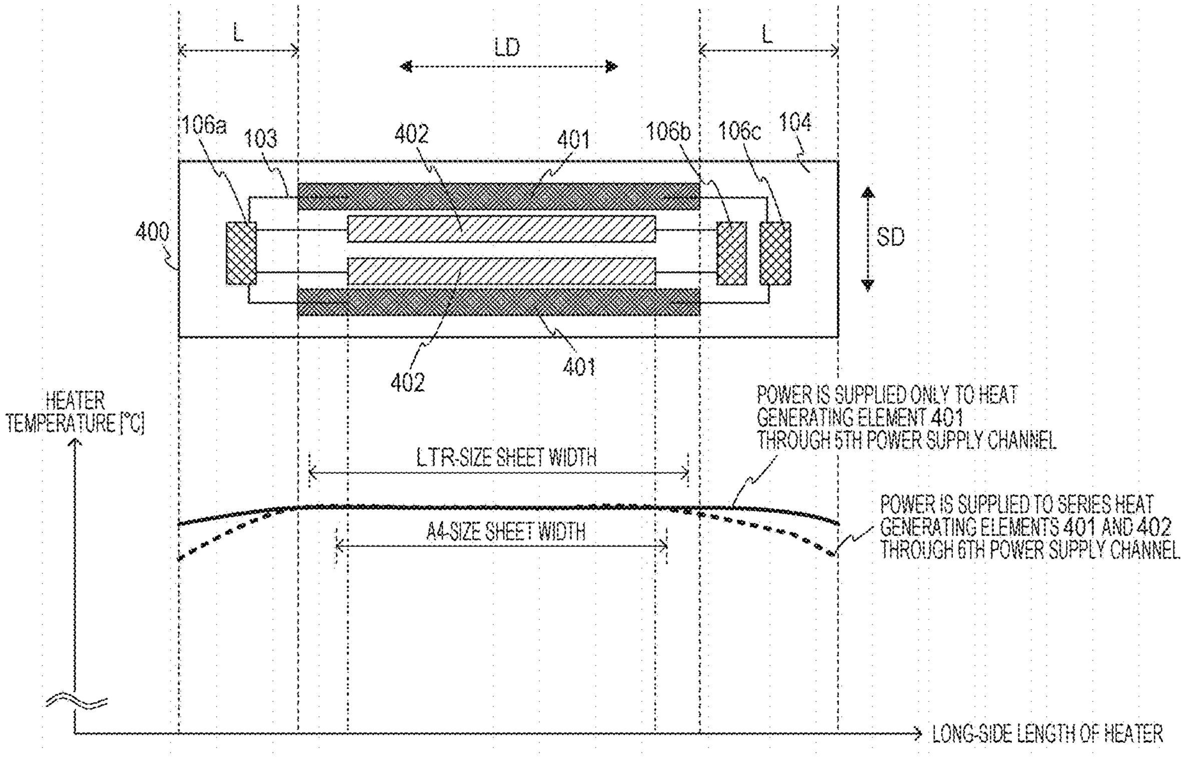
FIG. 16 illustrates a temperature distribution of the heater in the long-side direction.

A fourth embodiment will now be described with reference to FIGS. 15A to 16. FIG. 15A illustrates a heater control circuit 470 and a heater 400, which are included in a fixing unit 20 (see FIG. 2) according to the fourth embodiment. FIG. 15B illustrates a section of the heater 400 that is taken along line XVB-XVB. FIG. 16 illustrates a temperature distribution of the heater 400 in the long-side direction LD.

The heater 400 illustrated in FIG. 15A is substantially the same as the heater 300 according to the third embodiment but is different from the heater 300 according to the third embodiment in the lengths of the heat generating elements. The heater control circuit 470 according to the fourth embodiment is the same as the heater control circuit 370 according to the third embodiment. Therefore, the description provided with reference to FIGS. 12A to 14B for the third embodiment also applies to the fourth embodiment. Hence, description of the heater control circuit 470 is omitted herein.

As illustrated in FIGS. 15A and 15B, the heater control circuit 470 for the heater 400 basically includes the commercial AC power source 110, the current fuse 109, the electromagnetic relay 107, the noise filter 108, the triacs 111 and 116, and the heater 400. The heater 400 includes a heat generating element 401, which serves as a first heat generating element; and a heat generating element 402, which serves as a second heat generating element. The triacs 111 and 116 and the driving circuit therefor operate as with the case of the triacs 121 and 126 according to the first embodiment and are therefore not described herein.

In the fourth embodiment, as illustrated in FIG. 16, the length of the heat generating element 401 in the long-side direction LD is greater than the width of a letter (LTR)-size sheet (215.9 mm) by about 2 mm. Furthermore, the length of the heat generating element 402 in the long-side direction LD is smaller than the width of an A4-size sheet (210 mm) by about 2 mm. That is, in the fourth embodiment, the heat generating element 401 is longer than the heat generating element 402 in the long-side direction LD.

In the process of heating the fixing unit 20 (see FIG. 2) that is yet cold (see period I in FIG. 13, for example), the fifth power supply channel PSC5 illustrated in FIG. 12A is used. Accordingly, power is supplied only to the heat generating element 401. Therefore, as represented by a solid line in the graph illustrated in FIG. 16, the temperature of the heater 400 is high over an area inclusive of end parts in the long-side direction LD. In the process of heating the fixing unit 20 that is yet cold, a large amount of heat is released from relevant elements, including the ceramic substrate 104 and the pressure roller 22 (see FIG. 2), in areas denoted by L in FIG. 16. Therefore, the temperature rise in the heater 400 may be insufficient at the end parts in the long-side direction LD. Consequently, the sheet exited from the fixing unit 20 may have fixing failure at end parts thereof in the long-side direction LD.

In view of the above, in the process of heating the fixing unit 20, the heater 400 can be heated as widely as possible in the long-side direction LD. Such a heating technique is realized in the fourth embodiment by making the length of the heat generating element 401 longer by about 2 mm than the width of the LTR-size sheet, which has the largest width among those sheets conveyable by the fixing unit 20. Thus, the probability of fixing failure at end parts of the LRT-size sheet is reduced.

On the other hand, in the fourth embodiment, if the temperature of the fixing unit 20 (see FIG. 2) is close to the target temperature Ta illustrated in FIG. 13, the sixth power supply channel PSC6 is used. Accordingly, power is supplied to the heat generating elements 401 and 402 that are connected in series. Since the heat generating element 402 has a greater resistance value than the heat generating element 401, the power (voltage) to be applied to the heat generating element 402 is greater than the power (voltage) to be applied to the heat generating element 401. Therefore, as represented by a broken line in the graph illustrated in FIG. 16, the temperature of the heater 400 at the end parts in the long-side direction LD is slightly lower than in the case where the heater 400 is heated by using the fifth power supply channel PSC5.

After the fixing unit 20 (see FIG. 2) is heated satisfactorily (see period K in FIG. 13, for example), a problem of temperature rise in no-sheet areas tends to occur in which the heat generating elements (401 and 402) of the heater 400 generate heat with no sheet being present, in areas where the heat generating elements (401 and 402) do not overlap the sheet. In view of such a problem, the length of the heat generating element 402 in the long-side direction LD is optimized by being made slightly smaller than the width of the A4-size sheet so that the problem of temperature rise in no-sheet areas does not occur on A4-size sheets that are processed with the fixing unit 20 satisfactorily heated.

To summarize, employing the configuration according to the fourth embodiment not only produces the advantageous effects produced by the third embodiment but also achieves both a lower probability of fixing failure at end parts of the heater 400 in the long-side direction LD and a lower probability of temperature rise in no-sheet areas.

While the fourth embodiment relates to a case where the length of the heat generating element 401 in the long-side direction LD is greater than the length of the heat generating element 402 in the long-side direction LD, specific dimensions of the heat generating elements 401 and 402 are not limited.

Other Embodiments

While the heaters 100, 200, 300, and 400 according to the above embodiments are each directly in contact with the fixing film 21*c*, the heater is not limited thereto. For example, the heaters 100, 200, 300, and 400 may each be in contact with the fixing film 21C with a sheet member having a high thermal conductivity, such as an iron alloy or aluminum sheet, interposed therebetween. Even if such a sheet member is interposed between the heater 100, 200, 300, or 400 and the fixing film 21*c*, the pressure roller 22 nips the fixing film 21*c* in cooperation with the heater 100, 200, 300, or 400.

While the above embodiments each employ triacs each serving as a semiconductor switch for switching power supply channels, the semiconductor switch is not limited thereto. For example, the semiconductor switch may alternatively be a transistor such as a bipolar transistor.

While the above embodiments each employ a ceramic substrate, including a ceramic base, as a base substrate of the heater, the base substrate of the heater is not limited thereto. Instead of the ceramic substrate, the base substrate may alternatively be, for example, a metal substrate obtained by combining metal and an insulator.

The first to fourth embodiments described above may be combined in any way. For example, in the first embodiment, the heat generating element 101 may be made longer than the heat generating element 102.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-121724, filed Jul. 26, 2023, which is hereby incorporated by reference herein in its entirety.

What is claimed is:

1. An image heating device comprising:

a fixing member;

a heater configured to heat the fixing member; and a heater control circuit configured to control the heater, the image heating device being configured to heat a toner image formed on a sheet, wherein the heater includes a base substrate and a heat generating unit, the heat generating unit being provided on the base substrate and configured to generate heat when powered, wherein the heat generating unit includes a first heat generating element and a second heat generating element each extending in a long-side direction and being configured to generate heat when powered, the long-side direction being orthogonal to a short-side direction that is parallel to a sheet conveying direction, wherein the first heat generating element includes a first heat generating part and a second heat generating part, the first heat generating part being provided at one end part of the base substrate in the short-side direction, the second heat generating part being provided at an other end part of the base substrate in the short-side direction, wherein the second heat generating element is provided between the first heat generating part and the second heat generating part in the short-side direction, and wherein the heater control circuit includes a first power supply channel through which a first power is supplied to the heat generating unit;

a second power supply channel through which a second power that is lower than the first power is supplied to the heat generating unit; and a semiconductor switch configured to include a plurality of semiconductors and to be connected in parallel with the second heat generating element, the semiconductor switch selectively switching between the first power supply channel and the second power supply channel, wherein the first heat generating element is connected in parallel to the second heat generating element and the semiconductor switch, and wherein the semiconductor switch selects the first power supply channel by switching the semiconductor switch to be conductive, and selects the second power supply channel by switching the semiconductor switch to be nonconductive.

2. The image heating device according to claim 1, wherein the semiconductor switch has at least a period in which, if the heater has a temperature lower than a predetermined temperature, the first power supply channel is selected, the semiconductor switch selecting the second power supply channel if the heater has a temperature higher than the predetermined temperature.

3. The image heating device according to claim 1, wherein the second heat generating element includes a third heat generating part and a fourth heat generating part that each extend in the long-side direction and are arranged side by side in the short-side direction.

4. The image heating device according to claim 1, wherein the semiconductor switch includes a first semiconductor switch and a second semiconductor switch each including a plurality of semiconductors, wherein the first heat generating element is connected in series to the first semiconductor switch, wherein the second heat generating element is connected in series to the second semiconductor switch, wherein the first heat generating element and the first semiconductor switch are connected in parallel to the second heat generating element and the second semiconductor switch, and wherein the semiconductor switch selects the first power supply channel by switching the first semiconductor switch to be conductive and switching the second semiconductor switch to be nonconductive, and selects the second power supply channel by switching the first semiconductor switch to be nonconductive and switching the second semiconductor switch to be conductive.

5. The image heating device according to claim 4, wherein the first power supply channel allows the first power to be supplied to the first heat generating element and disallows any power to be supplied to the second heat generating element, and wherein the second power supply channel allows the second power to be supplied to the second heat generating element and disallows any power to be supplied to the first heat generating element.

6. The image heating device according to claim 4, wherein the first heat generating element has a smaller resistance value than the second heat generating element.

7. The image heating device according to claim 1, wherein the first power supply channel allows the first power to be supplied to the first heat generating element and the second heat generating element, and wherein the second power supply channel allows the second power to be supplied to the first heat generating element and disallows any power to be supplied to the second heat generating element.

8. The image heating device according to claim 1, wherein the first heat generating element has a greater resistance value than the second heat generating element.

9. The image heating device according to claim 1, wherein the first heat generating element is longer than the second heat generating element in the long-side direction.

10. The image heating device according to claim 1, wherein the base substrate is a ceramic substrate including a ceramic base.

11. The image heating device according to claim 1, wherein the fixing member is a cylindrical film.

12. An image forming apparatus comprising:

an image forming unit configured to form a toner image on a sheet;

the image heating device according to claim 1; and a pressing member configured to fix the toner image on the sheet by applying heat and pressure to the sheet in cooperation with the image heating device.

13. An image heating device comprising:

a fixing member;

a heater configured to heat the fixing member; and a heater control circuit configured to control the heater, the image heating device being configured to heat a toner image formed on a sheet, wherein the heater includes a base substrate and a heat generating unit, the heat generating unit being provided on the base substrate and configured to generate heat when powered, wherein the heat generating unit includes a first heat generating element and a second heat generating element each extending in a long-side direction and being configured to generate heat when powered, the long-side direction being orthogonal to a short-side direction that is parallel to a sheet conveying direction, wherein the first heat generating element includes a first heat generating part and a second heat generating part, the first heat generating part being provided at one end part of the base substrate in the short-side direction, the second heat generating part being provided at an other end part of the base substrate in the short-side direction, wherein the second heat generating element is provided between the first heat generating part and the second heat generating part in the short-side direction, and wherein the heater control circuit includes a first power supply channel through which a first power is supplied to the heat generating unit;

a second power supply channel through which a second power that is lower than the first power is supplied to the heat generating unit; and a semiconductor switch configured to include a plurality of semiconductors and to be connected in parallel with the second heat generating element, the semiconductor switch selectively switching between the first power supply channel and the second power supply channel, wherein the first heat generating element is connected in series to the semiconductor switch and the second heat generating element that are connected in parallel, and wherein the semiconductor switch selects the first power supply channel by switching the semiconductor switch to be conductive, and selects the second power supply channel by switching the semiconductor switch to be nonconductive.

14. The image heating device according to claim 13, wherein the first power supply channel allows the first power to be supplied to the first heat generating element and disallows any power to be supplied to the second heat generating element, and wherein the second power supply channel allows the second power to be supplied to the first heat generating element and the second heat generating element.

15. The image heating device according to claim 14, wherein the first heat generating element and the second heat generating element have an equal length in the long-side direction.

16. The image heating device according to claim 13, wherein the first heat generating element has a smaller resistance value than the second heat generating element.

17. The image heating device according to claim 13, wherein if the heater has a temperature lower than a predetermined temperature, the semiconductor switch firstly selects the second power supply channel and subsequently switches the power supply channel to the first power supply channel; and if the heater has a temperature higher than the predetermined temperature, the semiconductor switch selects the second power supply channel.

18. The image heating device according to claim 13, wherein the first heat generating element is longer than the second heat generating element in the long-side direction.

19. The image heating device according to claim 13, wherein the base substrate is a ceramic substrate including a ceramic base.

20. The image heating device according to claim 13, wherein the fixing member is a cylindrical film.

21. An image forming apparatus comprising:

an image forming unit configured to form a toner image on a sheet;

the image heating device according to claim 13; and a pressing member configured to fix the toner image on the sheet by applying heat and pressure to the sheet in cooperation with the image heating device.

* * * * *